(12) United States Patent
Mondiot et al.

(10) Patent No.: US 12,416,841 B2
(45) Date of Patent: Sep. 16, 2025

(54) LIQUID-CRYSTAL OPTICAL SYSTEM

(71) Applicants: SAINT-GOBAIN GLASS FRANCE, Courbevoie (FR); CENTRE NATIONAL DE LA RECHERCHE SCIENTIFIQUE, Paris (FR)

(72) Inventors: Frédéric Mondiot, Aubervilliers (FR); Hervé Montigaud, Aubervilliers (FR)

(73) Assignees: SAINT-GOBAIN GLASS FRANCE, Courbevoie (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 18/698,653

(22) PCT Filed: Oct. 5, 2022

(86) PCT No.: PCT/FR2022/051880
§ 371 (c)(1),
(2) Date: Apr. 4, 2024

(87) PCT Pub. No.: WO2023/057719
PCT Pub. Date: Apr. 13, 2023

(65) Prior Publication Data
US 2024/0329479 A1    Oct. 3, 2024

(30) Foreign Application Priority Data
Oct. 6, 2021   (FR) .................................. 2110590

(51) Int. Cl.
*G02F 1/137* (2006.01)
*G02F 1/01* (2006.01)
(Continued)

(52) U.S. Cl.
CPC ........ *G02F 1/13756* (2021.01); *G02F 1/0136* (2013.01); *G02F 1/133365* (2013.01);
(Continued)

(58) Field of Classification Search
None
See application file for complete search history.

(56) References Cited

U.S. PATENT DOCUMENTS

2012/0140133 A1   6/2012   Choi et al.
2019/0182476 A1*  6/2019   Kikuchi ............... H04N 13/398
(Continued)

FOREIGN PATENT DOCUMENTS

WO   WO 2004/025334 A2   3/2004
WO   WO 2010/136702 A1   12/2010
(Continued)

OTHER PUBLICATIONS

International Search Report as issued in International Patent Application No. PCT/FR2022/051880, dated Feb. 27, 2023.

*Primary Examiner* — Ryan Crockett
(74) *Attorney, Agent, or Firm* — Pillsbury Winthrop Shaw Pittman LLP

(57) ABSTRACT

An optical system composed of a first electrically controllable device which has variable scattering and color by first liquid crystals stabilized in a polymeric network and first dichroic dyes and a second electrically controllable device having variable polarization by second liquid crystals and second dichroic dyes.

20 Claims, 14 Drawing Sheets

(51) Int. Cl.
*G02F 1/1333* (2006.01)
*G02F 1/1343* (2006.01)
*G02F 1/1347* (2006.01)

(52) U.S. Cl.
CPC ........ *G02F 1/13439* (2013.01); *G02F 1/1347* (2013.01); *G02F 2202/04* (2013.01)

(56) References Cited

U.S. PATENT DOCUMENTS

2022/0100033 A1* 3/2022 Wu .................... G02F 1/133536
2023/0152649 A1* 5/2023 Mondiot ............. G02F 1/13775
349/35
2024/0427176 A1* 12/2024 Mondiot ............. G02F 1/13439

FOREIGN PATENT DOCUMENTS

| WO | WO 2015/177356 A1 | 11/2015 |
| WO | WO 2020/065038 A1 | 4/2020 |
| WO | WO 2021/115246 A1 | 6/2021 |

* cited by examiner

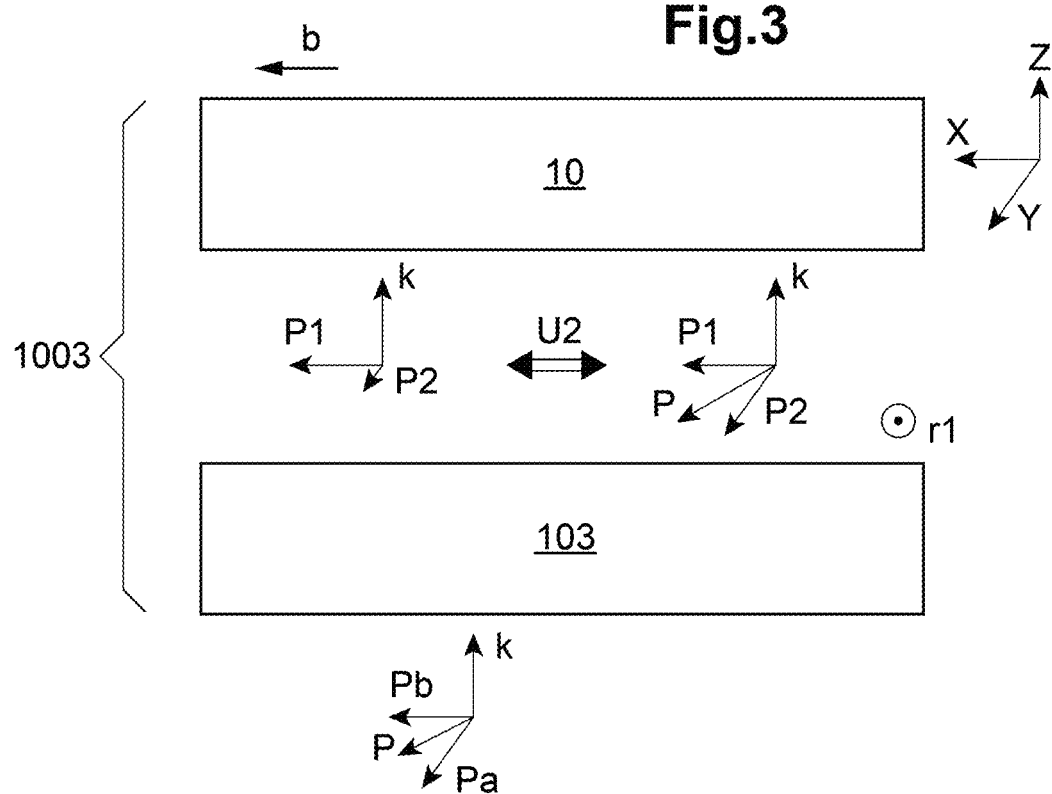

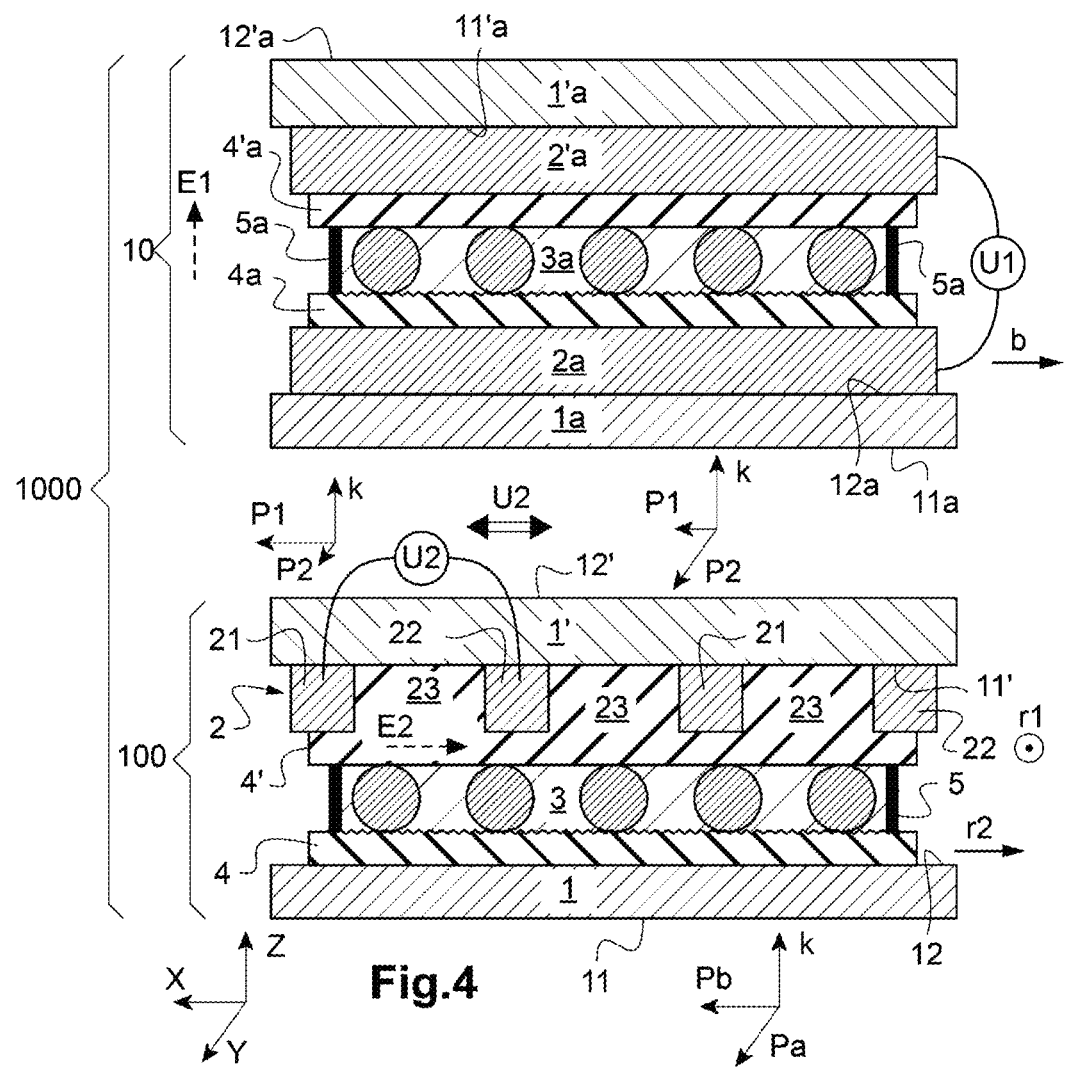
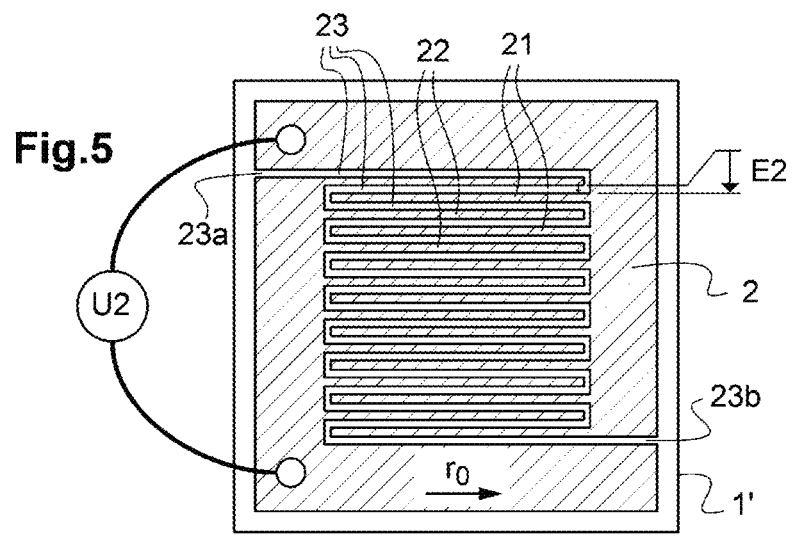

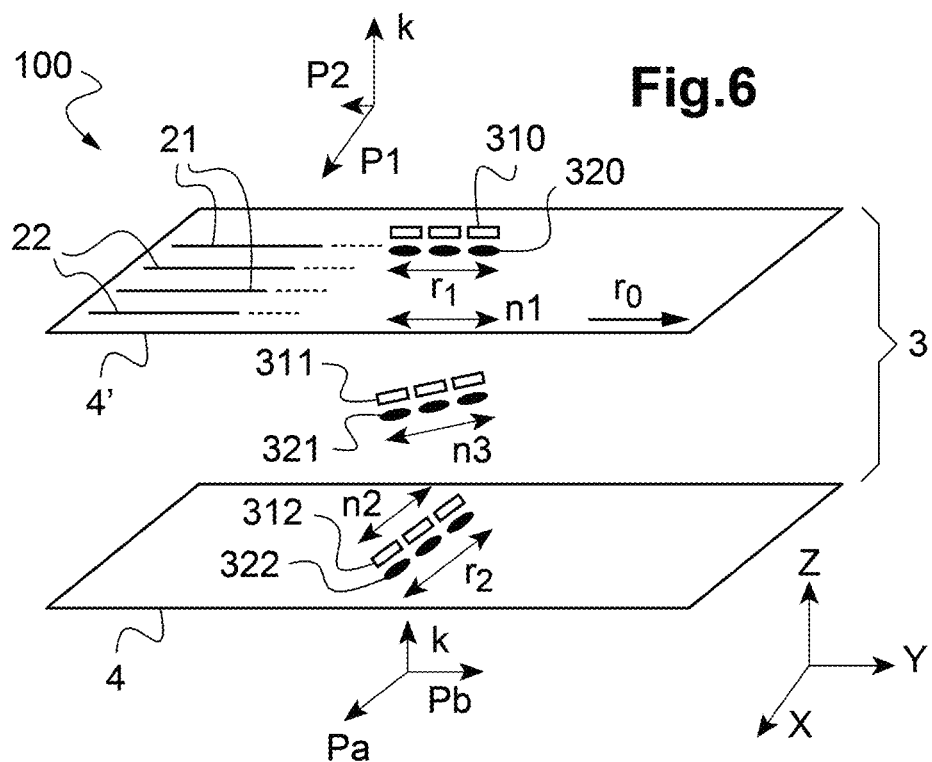
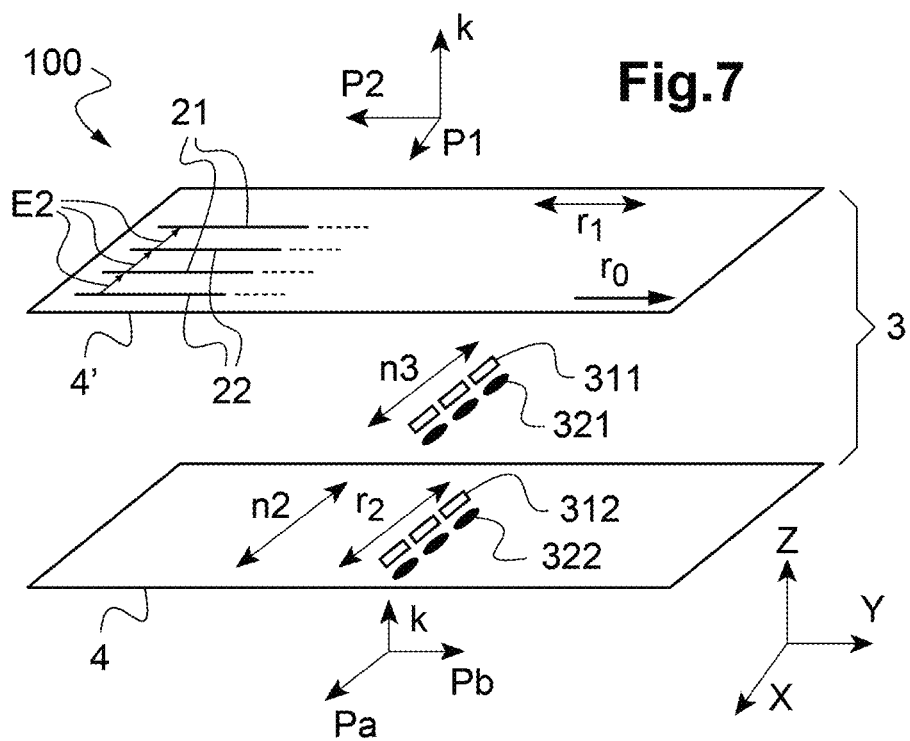

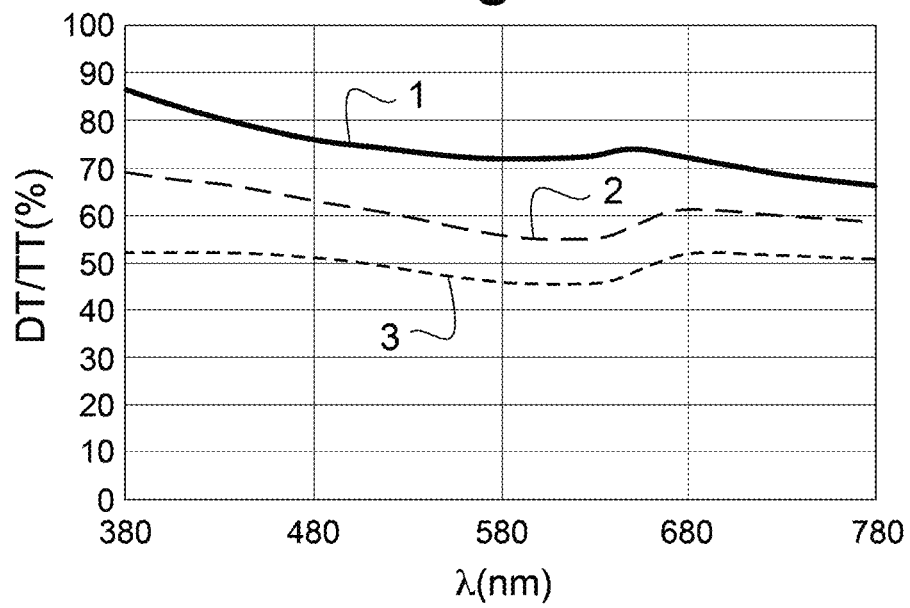
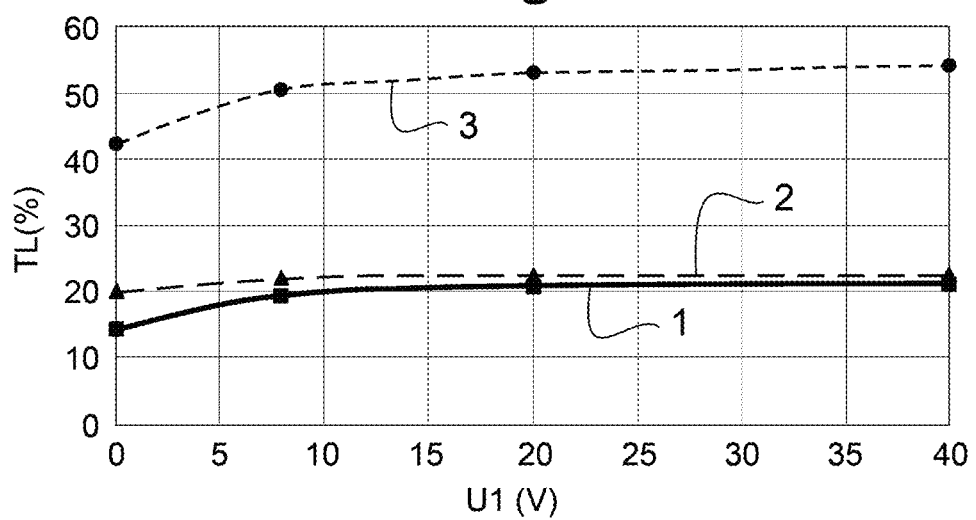

LIQUID-CRYSTAL OPTICAL SYSTEM

CROSS-REFERENCE TO RELATED APPLICATIONS

This application is the U.S. National Stage of PCT/FR2022/051880, filed Oct. 5, 2022, which in turn claims priority to French patent application number 2110590 filed Oct. 6, 2021. The content of these applications are incorporated herein by reference in their entirety.

The invention relates to a liquid crystal optical system including an electrically controllable variable-scattering by liquid crystals device.

Glazed units are known, certain features of which can be modified under the effect of a suitable supply of power, most particularly transmission, absorption, reflection at certain wavelengths of electromagnetic radiation, especially in the visible and/or infrared range, or else light scattering.

The electrically controllable glazed unit having liquid crystals can be used everywhere, both in the construction sector and in the automobile sector, each time that the view through the glazed unit has to be prevented at given moments.

Liquid crystal layers are known under the term "PDLC" (Polymer Dispersed Liquid Crystal), in the form of droplets of first liquid crystals dispersed in a polymer matrix, or else "PSLC" (Polymer Stabilized Liquid Crystal) liquid crystals distributed homogeneously.

Patent application WO 2020/065038 proposes an electrically controllable device having liquid crystals based on "PSLC" and include two-dimensional topological defects making it possible to obtain numerous scattering states reversibly.

One subject matter of the invention consists of developing an electrically controllable device having liquid crystals with improved electro-optical properties, which are adjustable in a tailored manner.

For this purpose, the present invention proposes a liquid crystal optical system including:
- a variable-scattering electrically controllable device (flat or curved device, especially flexible), called the first device, including a stack of layers (air gap optionally included, preferably forming a set of (solid) layers including a layer of liquid crystals) as follows:
- a first electrode that is transparent and especially self-supporting (optionally a flexible film) or preferably on a dielectric substrate, preferably transparent (and optionally flexible), in particular a substrate with a thickness of at most 1 cm, 5 mm, 3 mm or sub-millimeter, or in particular a substrate that is a plastic film or thin glass or ultra-thin glass ("UTG"), which film is of sub-millimetric thickness and even of at most 200 nm, which first electrode particularly comprises (or even consists of) a first electrically conductive layer (single layer or multilayer, in particular deposit(s)), especially mineral, in particular of a thickness of at most 200 nm (on the first substrate), which first electrode with a first main surface referred to as first connecting surface and a surface referred to as opposite surface Sb, especially which first electrode includes a first current-supplying means (busbar strip-especially metallic, made of copper, silver, etc.) at the edge of the first connecting surface
- a second transparent electrode, preferably facing the first electrode (two electrodes forming a "planar-planar" configuration), especially self-supporting (optionally flexible) or preferably on a dielectric support that is preferably transparent (preferably distinct from said substrate for the first electrode in "planar-planar" configuration), in particular a support whose thickness is at most 1 cm, 5 mm, 3 mm or sub-millimetric, in particular a plastic film or thin glass or ultra-thin glass ("UTG"), which film is of sub-millimetric thickness and even of at most 200 nm, which especially second electrode includes (or even consists of) a second electrically conductive layer (single layer or multilayer, in particular deposit(s)), especially mineral, in particular of at most 200 nm (on the support), which second electrode has a main surface referred to as second connecting surface SA2 and with an opposite external surface SB2, in particular which second electrode includes a second current-supplying means (busbar strip-especially metallic) at the edge of the second connecting surface and better still opposite the first current-supplying means, with a first electrical field E1 between the first and second electrodes
- a first dielectric electroactive layer with a main face referred to as face FA1 on the side of the first connecting surface SA1 and a main face referred to as opposite face FA2, preferably on the side of the second connecting surface SA2 preferably between the first and second electrodes (planar-planar configuration), the first electroactive layer being of sub-millimetric thickness $Ep_1$ and even of at most 100 μm and at least 50 nm, especially from 50 nm to 50 μm and even from 100 nm to 20 μm and better still of at least 1 μm or 5 μm, which first electroactive layer is made of a first material preferably thermotropic containing (or even consisting of):
- first liquid crystals (preferably thermotropic), preferably predominant by weight in the material (preferably at least 50%, 70%, 80%, 85% by weight of said first liquid crystals), especially first liquid crystals including mesogens, for example without polymer chain or which are groups incorporated in a main chain or side chain of a polymer (family referred to as "LCP"), in particular first liquid crystals of a size of at most 50 nm, 20 nm or 10 nm (and less than Ep1), in particular a mixture of several first liquid crystals (pure, in the sense of not being LCP), therefore several mesogens, especially first liquid crystals, which on face FA1 or preferably on face FA2 are oriented in a first direction b in the off state (no voltage) via a unidirectional anchoring layer in the first direction b in contact with face FA1 or FA2 preferably
- polymers forming a (three-dimensional) polymeric network, the first liquid crystals being (physically) stabilized by the polymeric network-(that is the "PSLC" family), preferably with at most 20%, 15%, 10%, 5% by weight of polymer (or polymers and polymer precursors),
- optionally precursors of (said) polymers or else non-crosslinked polymers (especially by adjusting the degree of polymerization),
- at least one first dichroic dye (in particular in the dissolved state, especially in the first liquid crystals), for example at most 30%, 20%, 10%, 5% by weight of first dichroic dye (one or several first dichroic dyes), first dichroic dye is especially of a size of at most 50 nm, 20 nm or 10 nm (and less than $Ep_1$); in particular first liquid crystals and first dichroic dye are of comparable sizes, for example each of less than 20 or 10 nm,
- preferably (first) spacers, especially of a height (and even of a larger dimension) of less than or equal to $Ep_1$, at the periphery (dielectric, transparent or not optionally masked by a frame, for example made of mylar, etc.) and/or dispersed in the first electroactive layer (dielectric, transparent, especially plastic, glass, silica, preferably sub-centimetric, especially beads)

optionally additives (other than the first dichroic dye), for example coloring particles such as metallic nanoparticles (gold, silver, alloy of both, etc.) or metallic oxide nanoparticles (tungsten oxide, tin oxide, etc.) or even any other non-dichroic dye or any other light-absorbing molecule, preferably of a height of less than or equal to Ep1 (and even of a larger dimension of less than or equal to Ep1)

Preferably, the first electroactive layer is sealed at the periphery by a dielectric seal which is especially polymeric (at the edge of the first and second connecting surfaces, in contact with the first crystal-based material or separated by a peripheral spacer), for example no more than 1 cm wide.

In addition, the first material has a mesophase referred to as P, from a temperature referred to as T1 (and below a temperature referred to as Tm which can be the transition temperature into the isotropic phase), wherein in particular the first material comprises (by volume, most commonly in the thickness) a set of domains (containing the first liquid crystals stabilized by the polymeric network and the first dichroic dye(s) and optionally additives), and even is substantially divided into said domains or volume elements, —the domains preferably extending at least over a fraction of the thickness Ep1 and preferably at least 90% of the thickness. In addition, the domains include two-dimensional topological defects, in particular line defects, with at least two shapes of line defects (for example one elliptical—circle included—the other a straight or curved line, hyperbola, etc.).

In particular, starting from a temperature T' greater than or equal to T1 (and below a temperature referred to as Tm which may be the transition temperature in isotropic phase), the electrically controllable device thus being capable of having a plurality of reversible scattering and/or colored states especially under a first electric field E1 between the first and second electrodes (normal or parallel to the first and second electrodes), in particular under a given electrical voltage U1 preferably at most 120 V or 100 V.

Furthermore, the system according to the invention includes, facing the first device) an electroswitchable device with variable polarization (in transmission), called the second device, including:

third and fourth transparent electrodes, with a second electric field E2 between the third and fourth electrodes, especially the third and fourth electrodes being coplanar or of planar-planar configuration, self-supporting (optionally flexible) or in the form of third and fourth electrically-conductive layers on the common carrier element (coplanar configuration) or separate bearing elements facing each other (planar-planar configuration)

a second electroactive layer with a main face FA3 on the side of the third electrode and a main face FA4 opposite FA3, having a submillimetric thickness $Ep_2$ and even of at most 100 μm and at least 50 nm, especially from 50 nm to 50 μm and even from 100 nm to 20 μm and better still of at least 1 μm or 5 μm, which second electroactive layer is made of a second—(preferably) thermotropic-material containing (or even consisting of):

second liquid crystals-(preferably thermotropic)—which are nematic (at T' and beyond), curved or not, preferably twisted (by the action of anchor layers), electrically unpowered in the off state and/or cholesteric—(preferably predominant by weight in the material (preferably at least 50%, 70%, 80%, 85% by weight of said second liquid crystals), especially second liquid crystals including mesogens, for example without polymer chain or which are groups incorporated in a main chain or side chain of a polymer (family referred to as "LCP"), in particular second liquid crystals of a size of at most 50 nm, 20 nm or 10 nm (and less than $Ep_2$), in particular a mixture of several second liquid crystals (pure, in the sense of not being LCP), therefore several mesogens second dichroic dyes (in particular in the dissolved state, especially in the second liquid crystals), for example at most 30%, 20%, 10%, 5% by weight of second dichroic dyes (one or several second dichroic dyes), which second dichroic dye is especially of a size of at most 50 nm, 20 nm or 10 nm (and less than $Ep_2$); in particular second liquid crystals and second dichroic dyes are of comparable sizes, for example each of less than 20 or 10 nm, which second dichroic dyes preferably have an absorption wavelength within the absorption range of the first dichroic dyes optionally polymers (non-crosslinked preferably) or polymer precursor preferably with at most 20%, 15%, 10%, 5% or 1% by weight of polymer (or polymers and polymer precursors), for example the second electroactive layer not being of the type (PDLC or PSLC)

preferably, other spacers, especially of a height (and even of a larger dimension) of less than or equal to $Ep_2$, at the periphery (dielectric, transparent or not, optionally masked by a frame, for example made of mylar, etc.) and/or dispersed in the second electroactive layer (dielectric, transparent, especially plastic, glass, silica, preferably sub-centimetric, especially beads)

optionally other additives (other than the second dichroic dyes), for example coloring particles such as metal nanoparticles (gold, silver, alloy of both, etc.) or metal oxide nanoparticles (tungsten oxide, tin oxide, etc.) or even any other non-dichroic dye or any other light-absorbing molecule, preferably of a height of less than or equal to $Ep_2$ (and even of a larger dimension of less than or equal to $Ep_2$).

Preferably, the second electroswitchable electroactive layer is sealed at the periphery by a dielectric seal especially polymeric (at the edge of the main faces), in contact with the second material based on second crystals or separated by a peripheral spacer).

The third electrode extends between the second electroactive layer and the first device (therefore on the side of the first device), for example oriented toward the second surface SB2 if the first device has a planar-planar electrode configuration.

Furthermore, the fourth electrode may be coplanar with the third electrode (therefore also between the second electroactive layer and the first device) or the active layer being between the third and fourth electrodes (planar-planar configuration).

Thus, according to the invention, the combination of said first electrically controllable device having polarization-sensitive variable scattering and said second variable-polarization electroswitching device makes it possible to have a wide range of available optical properties, in particular a wide range of haze and light transmission and coloration level. In particular, the lightness L* may vary.

The measurements of the total transmission TT or diffuse transmission DT, of LT or of the haze are identical to those described in the prior art WO 2020/065038.

The CIE 1976 L*a*b* color space, generally referred to as CIELAB, is a color space which is particularly used for characterizing surface colors. Three values, L*, a*, b*, are used: lightness L* results from surface luminance; the two parameters a* and b* express the difference of the color from that of a gray surface of the same lightness. The existence of a gray, uncolored, achromatic surface implies explicitly indicating the composition of the light which illuminates the colored surface. This illuminant is here standardized daylight D65.

The CIELAB color space is defined from the CIE XYZ space. Compared to the latter, it has the advantage of distributing colors more in line with the perception of color deviations by the human visual system. It is also possible to define a color difference deltaE between two colors defined by the square root of the sum of the difference to the square of L*, of the difference to the square of a*, and of the difference to the square of b*. The deltaE between two colors (off state and on state of the second device with the first device being off or between the off state of the first and second devices and on state on the first device or else two colors under electric field E1 with off state of the second device) in the present invention may be at least 1 or even at least 7.

The invention applies in various fields, especially in the building field (window, partition, glazed floor), outdoors especially in urban space, or in a road, sea, rail, or airborne vehicle (windshield, lateral, sunroof, etc.).

When incorporated into a building or vehicle glazing, the first device may either be oriented outwardly or inwardly.

The second device, preferably of similar shape to the first device, can extend over all or part of the first device depending on requirements.

The optical system may be without an optical element capable of depolarizing the light between the first device and the second device.

The optical system may be of any size since the first and second devices can be made easily on surfaces of a length of at least 1 m.

Between the first device and the second device, it may be desirable to avoid placing a diffuser.

Of course, it is possible to avoid any opaque, occulting or reflecting element between the first device and the second device.

However, a static polarizer may be added between the first device and the second device, such as a plastic film (stretched) with dichroic dyes. In particular, the static polarizer may be designed to block the given polarization P1. In particular, the static polarizer may be designed to block the given polarization P2.

The second device itself does not need polarizer(s), for example crossed polarizer and analyzer, to operate.

The switching time of each of the first and second devices may be less than a few seconds. The switching states of the optical system are reversible and (quasi) immediate.

The second device needs only one layer of liquid crystals (single-cell system) and not several layers of liquid crystals to form a variable polarizer.

The optical properties of the liquid crystal system may be adjustable:
  by switching off or applying the first electric field E1 (preferably alternating) and by choosing the voltage level U1
  and/or by switching off or applying the second electric field E2 (preferably alternating) and by choosing the voltage level U2
  by choosing the orientation of the output (dominant) polarization called P1 (for example in the off state of the second device) relative to a characteristic direction b of the first device detailed later, in particular P1 substantially parallel or substantially perpendicular to b.

In particular, it is possible to choose for the "off" state of the optical system (first and second devices switched off) a non-masking state (easy viewing through the optical system), with P1 perpendicular to b.

In particular, it is possible to choose for the "off" state of the optical system (first and second devices switched off) a masking state and darker with P1 parallel to b. The color depends essentially on the first dichroic dyes and can also depend on the second dichroic dyes.

It is possible to switch from one functional state to another:
  by powering up the second device when it is capable of delivering a sufficiently different polarization of P1, preferably normal to P1.
  by powering up the first device, the second device remaining off, with P1 parallel to b.

The optical system may have a thickness of at most 1 cm or 5 mm or 1 mm.

The second device may have a thickness of at most 5 mm or 1 mm or 0.5 mm.

The first device may have a thickness of at most 5 mm or 1 mm or 0.5 mm.

Regarding the first device, the domains induce the dependency of the scattering properties as a function of the polarization state of the light. The first dichroic dye induces the dependency of the absorption properties as a function of the polarization state of the light.

Regarding the second device, the second dichroic dyes, controlled by the second liquid crystals, preferably twisted in the off state, play a key role in providing the variable polarization function. The second device with variable polarization is preferably transparent has a haze of at most 10% or 1% or 0.5% in both the off state and the on state.

The voltages applied may be less than 120 V or even 80 V.

Provision may be made to apply U1 (and even to choose the level U1) and/or to apply U2 (and even to choose the level of U2) as a function of a setpoint. Thus, means for controlling the first device and/or the second device can be provided.

The parameters influencing the optical properties are especially:
  selecting first liquid crystals especially from the mixture of mesogens (in particular for the working temperature range and the voltage level U1 for "de-anchoring" in the on state) and their dielectric anisotropy
  the level of transparency of the electrodes with the lowest possible absorption (of their substrate if any), and in the case of electrodes in strips, the density of the strips (in order to lower the electrical voltage by reducing the space between strips and to reduce the zones without switching the liquid crystals to increase the off/on contrast)
  selecting first and/or second dichroic dyes (the dichroic ratio, etc.) in particular to have a highest and constant absorption spectrum in the visible range
  the thickness of the first and/or second electroactive layer.

selecting the anchoring layers of the first device (the type of defects or arrangement of defects) as of the second device (inducing the type of polarization in the off state, forcing the nematic to undergo a twisting deformation).

In particular, the haze value without an electric field applied (or for a given voltage) can vary based on the size or the type of two-dimensional defects, on their density, on the thickness of the electroactive material, on the choice of the first liquid crystals, on the polymeric network (degree of crosslinking, polymerization condition), on the monomer, and on the difference in the refraction indices of the polymer with the liquid crystals.

In particular, the haze value without applied electric field (or for a given voltage) will vary based on the orientation of the first liquid crystal(s) in particular based on the angle between the long (molecular) axis of the first liquid crystals and on the polarization axis of a light polarized along the plane parallel to the surface of the first electroactive layer.

The haze is for example defined as the ratio of the diffuse transmission DT??? to the total transmission TT. Preference is given to expressing it in %.

The haze H is preferably defined as the ratio between the integrated light transmission associated with the diffuse transmission DT and LT.

Each state of the optical, scattering and/or more or less colored system may be defined with a given color especially defined by a lightness L* (and also by a*, b*).

The whole system functions whether the unpolarized light is incident on the first or second device.

The optical characterization of the optical system according to the invention (and) is preferably done at the output of the first device on the side opposite the second device. For simplicity, the explanation of the influence of the second device on the first device is done from unpolarized incident light on the second device. However, substantially the same optical performances are obtained with unpolarized incident light on the first device (opposite the second device) by measuring the light at the output of the second device.

The level of scattering and/or coloration can be controlled, especially adjusted based on data collected by sensors (temperature, brightness, etc.) in communication with the optical system (controlling the power supply source(s)). It is possible to provide a separate or shared electrical supply circuit for example an AC voltage generator (and up to 120 V for example)

Preferably, the second device, in a functional state which is the off state, is able to deliver a light with a polarization P1 (dominant) (first functional state detailed below) and a second polarization P2 (preferably dominant) in the on state (the second functional state detailed below) in particular P1 is normal to r1 and P2 parallel to r1.

More broadly, the second device can have first and second functional states such that:

in the first functional state, from an unpolarized incident light on the side opposite to the first device, the second device is able to deliver an output light (polarized) on the first device side with a first component of the (polarized) electric field P1 along a first axis and a second component of the (polarized) electric field P2 along a second axis normal to the first axis, with a first polarization ratio defined by:

$$rp1 = \frac{T1}{T1 + T2} \quad \text{[Math 1]}$$

rp1 being at least 70% and better still at least 90%, and even at least 95% T1 being the total transmission at a wavelength between 380 and 800 nm along the first axis, or even the total transmission averaged at least between 400 and 600 nm and even from 380 to 640 nm and T2 being the total transmission along the second axis at the wavelength between 380 and 800 nm, or even the total transmission averaged at least between 400 and 600 nm and even from 380 to 640 nm for a first voltage U2a between the third and fourth electrodes, preferably zero and in the second functional state:

either i) from an unpolarized incident light opposite to the first device, the second device being able to deliver a (polarized) output light on the first device side with a second polarization ratio defined by:

$$rp2 = \frac{T'2}{T'1 + T'2} \quad \text{[Math 2]}$$

rp2 being at least 30%, and even at least 50% or 60%

T'1 being the total transmission at a wavelength between 380 and 800 nm along the first axis, or even the total transmission averaged at least between 400 and 600 nm and even from 380 to 640 nm and T'2 being the total transmission along the second axis at the wavelength between 380 and 800 nm, or even the total transmission averaged at least between 400 and 600 nm and even from 380 to 640 nm, for a given second voltage U2b between the third and fourth electrodes, potentially zero, U2b being distinct from U2a or j) from an unpolarized incident light on the side opposite to the first device, the second device being able to provide an unpolarized output light on the side of the first device, one of the first and second functional states being in the off state (no electrical voltage), the other one of the first and second functional states being in an on state (electrical power on).

Preferably, the first functional state is the off state and the second functional state is preferably according to i) or the first functional state is an on state and the second functional state is according to j).

In one configuration, the first functional state is the off state and the second functional state is preferably according to i). Naturally, the second device then has a multitude of functional states in the on state. There is in particular a threshold voltage from which the anchoring force of the second liquid crystals is overcome for a part of the liquid crystals and the more the voltage is increased, the more the liquid crystals reorient up to a saturation voltage which is preferably at most 80 V.

It is then possible to have a polarization ratio which varies according to the voltage U2 applied.

Advantageously, the first electric field E1 is alternating and preferably the first applied electric voltage U1 is at most 120 V and the second electric field E2 is alternating and preferably the second applied voltage U2 is at most 120 V. Preferably, the first and second electrodes are in distinct planes, and the first liquid crystals have positive dielectric anisotropy (independent of the frequency of the first electric field E1), the first electric field E1 being perpendicular to the first and second electrodes.

E1 like E2 is preferably alternating with a frequency from 50 Hz, for example a frequency of 100 Hz, 1 kHz or 2 kHz. Voltage is intended to mean the peak voltage (Vpeak).

Thus, the changes of orientation of the first liquid crystals are preferably induced by E1 normal to the face FA1 (in the midplane if the stack is curved, for example flexible, and between curved substrates, especially made of glass).

The optical system according to the invention in the off state (first and second devices off) can be colored with a given color C0 especially defined by a lightness L*0 (and further by a*0, b*0).

The optical system according to the invention in the on state of the second device (first device off) can be colored with a given color Ca especially defined by a lightness L* (and also by a*, b*).

The optical system according to the invention in the on state of the first and second devices can be colored with a given color Cb especially defined by a lightness L* (and also by a*, b*).

The optical system according to the invention in the on state of the first device (second device off) can be colored with a given color Cb especially defined by a lightness L* (and also by a*, b*).

Furthermore, the color may vary as a function of the voltage U1 and/or U2.

The choice of U1 and/or U2 can be controlled, especially adjusted based on data collected by sensors (temperature, brightness, etc.) in communication with the device (controlling the power supply source).

The third (respectively the fourth) electrode can include (or even consist of) an electrically conductive layer (monolayer or multilayer, in particular deposit(s)), especially mineral, in particular of a thickness of at most 200 nm (electrically conductive layer on a carrier element, preferably an electrically conductive layer between carrier element and anchoring layer), especially including a means for supplying current (strip-busbar-especially made of metal, copper, silver, etc.) at the edge.

In a planar-planar configuration, the third and fourth electrodes in layers extend over all or part of their separate carrier element.

In a first preferred embodiment, for in-plane switching, the third and fourth electrodes (preferably in the layer) are coplanar (on a common carrier element preferably rather than self-supporting), forming an alternation of first and second electrically conductive strips (metallic, for example) at distinct potentials, elongated strips (linear, preferably rectilinear) in a direction r0 and preferably with the greatest possible density of bands (strips of width as small as possible and with the smallest possible interstrip space).

Thus, a potential difference is applied between 2 "terminals" situated in the same plane and electrically insulated two by two.

The second field E2 is alternating is then mostly planar (parallel to the third and fourth electrodes).

It is sought while preserving the electrical conductivity, that the strips are as narrow as possible for improving the "polarizer" power in the ON mode. It is also sought to reduce as much as possible the interstrip width (insulating strips without an electrical conductor) in order to reduce the potential difference to be applied.

For example, the electroconductive strips and/or the interstrip width (insulating strips) are at most 50 µm or 30 µm or 10 µm.

For example, the insulating strips form a serpentine arrangement and a first zone of the electroconductive layer is isolated with a second zone of the layer by a first portion of the first insulating strip of the coil and by a last portion of the last insulating strip of the coil.

It is possible to provide this arrangement of insulating strips by removing an electrically conductive layer, especially by laser beam. The strip thickness limit is given by the size of the laser beam. The limit of the interstrip distance is dictated by the movement of the laser beam.

The dielectric anisotropy of the first electroactive layer (of the first liquid crystals) is nonzero and may be negative or positive. The dielectric anisotropy of the second electroactive layer (of the second liquid crystals) is nonzero and may be negative or positive.

The first device may comprise:
- a (first) directional anchoring layer along a first direction b on one of faces FA1 or FA2, preferably on face FA2, (first liquid crystals are generally oriented in this face FA2 or FA1 in this first direction b in the off state of the first device)
- in particular a (second) anchoring layer on the other of the faces FA1 or FA2, preferably on face FA1, preferably separate anchoring layer (antagonist), preferably normal anchoring, then inducing first liquid crystals oriented perpendicular to this other face FA1 or FA2 (homeotropic anchoring).

In a configuration with the third and fourth electrodes coplanar, the second device, with preferably second twisted nematic liquid crystals in the off state of the second device, includes:
- a (third) unidirectional planar anchoring layer according to a (second) direction r1 on (in contact with) the main face FA3 of the second electroactive layer and on the third and fourth electrodes, in particular P1 is normal to r1 and P2 parallel to r1
- and another (or fourth) unidirectional planar anchoring layer according to a (third) direction r2 (distinct from r1 preferably) on (in contact with) the main face FA4 of the second electroactive layer.

In particular, r1 forms an angle of 90°±15° and better still of 90°±5° with r2 (the second nematic liquid crystals then having a strong twist in the off state):
- r0 forms an angle of at most 15° and even at most 5° with r1 and the second liquid crystals have positive dielectric anisotropy (then the first functional state of the second device with the polarization P1 being the off state and second functional state being an on state and along i))
- or r0 forms an angle of 90°±15° and even at most 90°±5° with r1 and the second liquid crystals have negative dielectric anisotropy (then the first functional state of the second device with the polarization P1 being the off state and second functional state being an on state and along i))

Preferably, the second device, in a first functional state which is the off state, is able to deliver a light with a polarization P1 (dominant) and a second polarization P2 (dominant) in the functional on state (state i) in particular P1 is normal to r1 and P2 parallel to r1.

In an embodiment (in coplanar electrode mode of the second device) with j) unpolarized light, the second nematic liquid crystals are at dual switching frequency having a dielectric anisotropy passing from negative to positive as a function of the frequency and the second alternating electric field E2 is at a variable frequency.

Alternatively to the coplanar configuration, the second electroactive layer is between the third and fourth electrodes (surface SA1 FA3 face side, surface SA2 on FA4 face side) and the second device includes:
- a unidirectional planar anchoring layer in a direction r1 in contact with face FA3 of the second electroactive layer and on the third electrode (especially in contact with the third electrode)

and another unidirectional planar anchoring layer in a direction r2 in contact with face FA4 of the second electroactive layer and on the fourth electrode (especially in contact with the fourth electrode)

r1 forms an angle of at most 15° and even of at most 5° with r2, the second liquid crystals have positive dielectric anisotropy, (then the first functional state of the second device with the polarization P1 being the off state and second functional state of the second device being an on state (on, with electrical voltage) and following j) therefore unpolarized output light)

or r1 forms an angle of 90°±15° and better still of 90°±5 with r2, the second liquid crystals have positive dielectric anisotropy (then the first functional state of the second device with the polarization P1 being the off state and the second functional state of the second device being an on state and along j) therefore unpolarized output light)

or r1 forms an angle of at most 15° and even of at most 5° with r2, the second liquid crystals have negative dielectric anisotropy, the orientation of the second liquid crystals in the thickness of the second electroactive layer in the off state of the second device is predominantly homeotropic. (then the first functional state of the second device with the polarization P1 being the on state and the second functional state of the second device being the off state and along j), therefore non-polarized output light).

In this latter case, the anchoring layers in the second device can each an anchoring layer (polyimide, etc.) generating homeotropic anchoring, with rubbing nevertheless in order to obtain a pre-tilt angle with the long axis of the mesogens of the second liquid crystals. Then an off state is almost mid-distance and the on state where the electric field applied along the vertical will reorient the negative dielectric anisotropy mesogens in the rubbing direction. In this specific configuration, rubbing an anchoring layer does not have a macroscopic unidirectional planar orientation effect in the OFF state owing to the design of pre-tilt on a layer generating, without rubbing, a homeotropic anchoring.

This type of anchoring with pretilt is described in the article by Li and other entitled "Dye-doped dual-frequency nematic cells as fast-switching polarization-independent shutters," Vol 27 no. 4 Feb. 2019 OPTICS EXPRESS 3861 pages concerning dual liquid-crystal cell systems for changing from linear polarization to total extinction.

In addition, the first electroactive layer (and therefore the electrically controllable device having variable scattering) has an optical response dependent on the polarization of the incident light.

This differentiated response to the polarization of light is induced by:

the form factor, the internal structure of two-dimensional topological defects, in particular line defects, in particular line defects of non-toric focal conic domains, (non-"TFCD") of smectic mesophases, and/or the arrangement of the different domains (especially focal conic domains of smectic mesophases including "TFCD") in particular their shape, their orientation their degree of symmetry, distributed for example randomly, irregular, etc., a distribution dictated by the anchoring conditions (2D anchoring layer adjustable as needed for example multidirectional anchoring).

An example of various architectures of the polarization-sensitive smectic focal conic domains (in other words the focal conic domain) is given in the publication entitled "Smectic Layer Origami Preprogrammed Photoalignement" by Ling Ma et al, Advances Materials 2017 1606671 pages 1 to 7.

In a preferred embodiment, the second device, in a first functional state which is the off state, is able to deliver light with a polarization P1, the first device comprises a (first) directional anchoring layer in a first direction b on face FA1 or preferably on face FA2, the second device is arranged such that P1 forms an angle with b of 0°±20° or better of 0°±5° (in particular r2 forming an angle with b of 0°±20° or better still of) 0°±5°.

In one embodiment, the second device, in a first functional state which is the off state, is able to deliver light with a polarization P1, the first device includes a directional anchoring layer in a first direction b on face FA1 (in contact with face FA1) or preferably on face FA2 (in contact with face FA1), first liquid crystals are then generally oriented on face FA1 or preferably on face FA2 in this first direction b), the second device is arranged such that P1 forms an angle with b of 90°±20° or better still 90°±5°, (in particular r1 forming an angle with b of 90°±20° or better still) 90°±5°.

Preferably, as already indicated, use is made of anchoring layers which serve to orient the liquid crystals by surface interactions during manufacture, in the absence of an applied electrical field (E1 or E2).

Up to a certain distance away from the surface of the anchoring layers, the (first or second) liquid crystals may remain oriented thereto up to a certain field strength (voltage).

The thickness of the anchoring layers (of the second device and/or of the first device) is preferably at most 1 µm, better still submicronic, for example less than 600 nm.

There may also be several distinct anchoring zones on the same surface. These defects are generated by mechanical deformations of the structure of the material and are obtained by the limit conditions imposed by the two anchoring layers, forcing the liquid crystals into contact which these layers to specific and separate orientations.

As a unidirectional planar anchoring (first or second device), use may be made of a film of fluoropolymer, such as polytetrafluoroethylene, PTFE, or teflon (with the polymer chains aligned in the direction of displacement of the teflon bar during deposition).

The unidirectional planar anchoring fixes the zenithal and azimuthal orientation of the liquid crystal director n), for example by texturization, brushing (also called rubbing) the planar anchoring layer, for example including nanogrooves or microgrooves.

Use may be made of a velvet fabric for the brushing.

For a normal anchoring (preferably first device), the most commonly used layers are based on octyltrichlorosilane (OTS) and N,N-dimethyl-N-octadecyl-3-aminopropyltrimethoxysilane chloride (DMOAP) or polyimides as well.

A layer based on sodium dodecyl sulfate (SDS) or even mixtures of alkanethiols may also generate normal anchoring.

One or more anchoring layers are for example deposited by the liquid route.

One or more anchoring layers may be a preferably thin (flexible) film, for example at most 200 µm or 50 µm, which especially bears a (first and/or second) electrode of the first device. One or more anchoring layers may be a preferably thin (flexible) film, for example at most 200 µm or 50 µm, which is especially an electrode carrier (third and/or fourth) of the second device.

An anchoring layer (of the first or second device) is for example:
- preferably dielectric (especially amorphous, polymeric and/or mineral, a glass) with a functionalization of the surface; in particular, a layer based on polyimide polyvinyl alcohol (PVA), for example for a planar anchoring (in particular for the first device)
- electrically conductive, especially which is a fraction of the thickness of the electrode of the first device (first or second full surface electrode, planar-planar electrode configuration) or of the second device (third or fourth full surface electrode, planar-planar electrode configuration) (for example for planar anchoring).

An air gap provides normal anchoring, but it is preferable to have a solid anchoring layer. It is also preferable for the anchoring layers, especially dielectric, to be distinct from the electrodes.

There may even be more than two anchoring layers (three or more), then, there are several layers of liquid crystals spaced apart by anchoring layers. A single liquid crystal layer is preferred for simplicity for each of the first and second devices.

The second device, in a first functional state which is preferably the off state, is capable of delivering light with a polarization P1 in particular normal to r1 (preferably P1: forming an angle with the first direction b of 0° or 90°±20° or even of 0° or) 90°±5°. And:
- in the first functional state, the haze H0 at the output of the first device is at least 10% (and even 20%) greater than the haze obtained with an unpolarized incident light at the input of the second device
- and preferably in a second functional state, which is preferably the on state of the second device, the haze H1 at the output of the first device is at least 10% (and even 20%) less than the haze obtained with an unpolarized incident light at the input of the second device.

The first liquid crystals preferably have overall a degree of organization in a given direction b on face FA1 or on face FA2 (referred to as planar orientation face).

Their director n—or long axis—is globally along this first direction b). b is in particular the (rubbing) axis of a unidirectional planar anchoring layer in contact with this planar orientation face (generating interactions between liquid crystals with this solid layer).

Defect line domains are preferred since the haze (scattering power) is remarkable. Focal conic domains of smectic (meso) phase are preferred as described in application WO 2020/065038 incorporated by reference.

Defect domains generally each comprise two defect lines, are focal conic domains, and go in pairs, especially an elliptical with different degrees of eccentricities and the other hyperbolic, thus the name "elliptic-hyperbolic focal conic domain" or EHFCD given to them.

Preferably, the mesophase P is nematic and the domains are focal conic domains especially of smectic mesophase (mesophase P'), in particular with two defect lines, preferably one elliptical and the other hyperbolic (EHFCD).

The focal conic domains especially EHFCD preferably form a linear network parallel to the direction b.

The (first and/or second) dichroic dye may be an anisotropic organic molecule which has optical anisotropy, is elongated, especially rod-shaped. It is in the dissolved state in the material, especially dissolved in the first liquid crystals. The % of (each) dichroic dye is adjusted so as not to exceed the solubility limit. In particular, one (or more) dichroic dye(s) is (are) chosen which is (are) chemically compatible with the liquid crystals.

In particular, the (each) (elongated, rod-shaped) dichroic dye may have a long molecular axis and the absorption varies along the long axis or the short axis.

The (first or second) dichroic dyes are controlled by the orientation of the (first or second) liquid crystals of the (first or second) electroactive layer at stake, the movement (the rotation) of the liquid crystals under the effect of the electric field (E1 or E2) at stake, tending to be aligned with the electric field at stake, leading to the movement (the rotation) of the dichroic dyes, the long axis also tending to align it with the electric field at stake.

The absorption of a dichroic dye thus varies based on the orientation thereof relative to the polarization of the incident light. On the contrary, a non-dichroic dye, which does not exhibit absorption anisotropy, is insensitive, or not very sensitive, to the electric field and will even not change the absorption. Such dyes may be added to adjust the desired hue in the first device.

The first dichroic dye may have a first absorption band (in the visible) preferably of at least 200 nm or 300 nm, and even preferably from 380 nm to 650 nm or even at 700 or 780 nm.

The second dichroic dye may have a second absorption band (in the visible) preferably of at least 200 nm or 300 nm, and even preferably from 380 nm to 650 nm or even at 700 or 780 nm.

The first and second dichroic dyes preferably have a common absorption range (without necessarily having the same absorption maximum nor the same absorption profile) preferably of at least 1 nm or 10 or 100 nm.

The first dichroic dye may have a maximum light absorption for a light polarized in a direction r1.

The second dichroic dye may have a maximum light absorption for a light polarized in this same direction r1.

There are several families of dichroic dyes, especially those described in the publication by Mark T Sims entitled "dyes as guests in ordered systems: current understanding and future directions" Liquid Crystals, 2016, Vol 43, NOS. 13-15, page 2363-2374.

The dichroic dyes according to the invention may be azo dyes, with AZO (—N=N), especially rod-shaped. It is possible to induce chemical changes to the azo dyes, for example with ester groups incorporated (cf. p. 2366 of the above-mentioned publication).

Other dyes are anthraquinones, which are generally fused rings, or rod-shaped by adding substituents. Examples of dichroic dyes (chromophores) are in Table 1 of this above-mentioned publication).

Examples of dichroic dyes which are suitable for the invention are additionally mentioned in the book entitled "Electrooptic effect in Liquid Crystal Materials" by L. M Blinov et al., published by Springer in 1994, in particular in chapter 2.3 entitled "Optical Anisotropy and Dichroism" and pages 66 to 68, including Table 2.2.

For example, for a blue dye, it is possible to choose, as maximum absorption wavelength, 630 nm±10 nm and, as wavelength outside the absorption band, 430 nm±50 nm or ±10 nm. Mention may be made, for example, of the dye M412 sold by Mitsui Chemicals.

For example, for a red dye, it is possible to choose, as maximum absorption wavelength, 500 nm±10 nm and, as wavelength outside the absorption band, 650 nm±50 nm or ±10 nm. Mention may be made, for example, of the dye SI-426 sold by Mitsui Chemicals.

For example, for a yellow dye, it is possible to choose, as maximum absorption wavelength, 400 nm±10 nm and, as wavelength outside the absorption band, 600 nm±50 nm or ±10 nm. Mention may be made, for example, of the dye SI-486 sold by Mitsui Chemicals.

For example, for a black dye, mention may be made of the dye SI-428 sold by Mitsui Chemicals.

Independently, it is possible to color (to a varying degree) one or several of the elements of the system (electrode, anchoring layer, substrate or support, lamination interlayer, glass backing, etc.), for example with a maximum absorption separate from the first dichroic dye.

The first device may include:
a transparent dielectric substrate, bearing the first electrode (and an anchoring layer, especially normal on the first electrode), which substrate is chosen from a glass sheet or a transparent polymeric sheet with an optional external scratch-resistant layer
a transparent dielectric support, bearing the second electrode (if flat configuration) and at least one anchoring layer, especially one-way, according to b (preferably on the first electrode), which substrate is chosen from a glass sheet or a transparent polymeric sheet with an optional external scratch-resistant layer.

The second device may include:
a first transparent dielectric element, bearing the third electrode (and preferably the fourth electrode) (coplanar configuration) and even of the anchoring layer, preferably unidirectional according to r1, the first element being chosen from a glass sheet or a transparent polymeric sheet distinct from or corresponding to said dielectric support
a second transparent dielectric element, bearing the fourth electrode if planar-planar configuration and bearing at least one anchoring layer, preferably one-way, according to r2, the second element being chosen from a glass sheet or a transparent polymeric sheet (with an optional external scratch-resistant layer)

The first device and the second device may be spaced apart, share a common support (on one and the same side or on either side) or be bonded (dielectric support and first dielectric element bonded).

In one embodiment, the first device and the second device are connected:
by a transparent bonding layer, especially an optical glue (OCA) or a thermoplastic layer, especially an EVA or PVB lamination interlayer,
or a transparent common support, preferably plastic glass, is bears:
on a first main face of the second electrode (or even of the first electrode if coplanar) and especially of the rest of the stack of layers
and on the other side, on an opposite second main face of the third electrode (or even the fourth electrode if coplanar) and especially the rest of the stack of layers.

The transparent bonding layer may be colorless or tinted.

The transparent bonding layer may have a thickness of at most 0.5 mm or even 0.1 mm.

The optical system can be flat or curved, flexible to adapt to the curvatures, for example, of a (monolithic or laminated) glazing. It is then curved on the monolithic glazed unit or, for example, within said laminated glazing.

The invention also relates to an optionally curved laminated glazed unit including:
a first additional sheet of glass, especially of thickness from 0.7 mm to 4 mm
a thermoplastic, especially EVA or PVB, lamination interlayer
a second additional sheet of glass, especially of thickness from 0.7 mm to 4 mm or even of less than 0.7 mm, or else a sheet of plastic such as a polycarbonate or a PMMA (especially with a PU lamination interlayer),
the main internal faces, referred to as F2 and F3, of the first and second additional glass sheets facing one another, the optical system as previously described preferably being between faces F2 and F3 and preferably in the lamination interlayer.

Preferably, relating to the first device, the substrate being polymeric and even the support being polymeric, occupying all or part of the surface of the first sheet.

Preferably, the first element being polymeric and even the second element being polymeric, occupying all or part of the surface of the first device.

Preferably, the thermoplastic lamination interlayer surrounds the edge of the optical system (first and second device).

The edge face of the optical system may be set back relative to the outermost edge face of the lamination interlayer (or of the first sheet).

Preferably, the optional layer-bearing sheets (substrate, support, first and second elements) are preferably of a thickness of at most 0.7 mm and even of at most 0.3 or 0.2 mm. For the glass sheets, it is possible to choose thin glass (less than 1 mm) and even ultra-thin glass (UTG).

One of the additional glass sheets may be tinted and the other may be clear or extra-clear. The thermoplastic lamination interlayer may be colorless (clear, extra-clear) or tinted.

For the substrate and/or the support or else for an additional glass sheet or a glazed unit of a laminated and/or multiple glazed unit, it is possible to choose a clear or extra-clear glass. A clear glass typically contains a content by weight of iron oxide of the order of 0.05 to 0.2%, while an extra-clear glass generally contains approximately 0.005 to 0.03% of iron oxide.

The additional glass sheet or a glazed unit of a laminated and/or multiple glazed unit may nonetheless be tinted, for example blue, green, gray or bronze.

A tinted additional glass sheet or a tinted glazed unit of a laminated and/or multiple glazing, may preferably have a light transmission $T_L$ of less than or equal to 10%.

The glass is preferably of soda-lime-silica type but it can also be a glass of borosilicate or alumino-borosilicate type. The thickness of the glass is generally within a range extending from 0.5 mm to 19 mm, preferably from 0.7 to 9 mm, especially from 2 to 8 mm, or even from 4 to 6 mm. The glass is preferably float glass.

The thermoplastic lamination interlayer provides a connection to a rigid or flexible element. This polymeric lamination interlayer may especially be a layer based on polyvinyl butyral (PVB), ethylene vinyl acetate (EVA), polyethylene (PE), polyvinyl chloride (PVC), thermoplastic urethane, polyurethane (PU), ionomer, polyolefin-based adhesive, thermoplastic silicone or multi-component or single-component, thermally crosslinkable (epoxy, PU), or UV-crosslinkable (epoxy, acrylic resin) resin.

The PVB interlayer can be wedge-shaped, thus with a cross section which decreases in wedge shape from the top toward the bottom of the laminated glazed unit in order to avoid a double image in the case of a head-up display (HUD), very particularly for a windscreen. The PVB interlayer is optionally acoustic and/or tinted. The acoustic PVB interlayer can comprise at least one "central" layer made of viscoelastic plastic with vibro-acoustic damping properties, especially based on polyvinyl butyral (PVB) and plasticizer, and further comprising two external layers made of standard PVB, the central layer being between the two external layers.

The first and/or second glazed unit of the laminated glazed unit may (depending on the aesthetic rendering or the desired optical effect) be a clear glass (light transmission $T_L$ higher than or equal to 90% for a thickness of 4 mm), for example a glass of standard soda-lime composition such as Planilux® from Saint-Gobain Glass, or an extra-clear glass ($T_L$ higher than or equal to 91.5% for a thickness of 4 mm), for example a soda-lime-silica glass with less than 0.05% Fe III or $Fe_2O_3$ such as the glass Diamant® from Saint-Gobain Glass, or Optiwhite® from Pilkington or B270® from Schott, or a glass of another composition described in document WO04/025334. The Planiclear® glass from the Saint-Gobain Glass company can also be chosen.

The glass of the first and/or second glazed unit can be neutral (without coloration) or (slightly) tinted, especially gray or green, such as the TSA glass from Saint-Gobain Glass. The glass of the first and/or second glazed unit may have undergone a chemical or heat treatment of the hardening or annealing type or a tempering (especially in order to obtain a better mechanical strength) or be semitempered.

The light transmission $T_L$ can be measured according to the standard ISO 9050:2003 using illuminant D65 and is the total transmission (especially integrated over the visible region and weighted by the curve of sensitivity of the human eye), taking into account both direct transmission and possible diffuse transmission, the measurement being carried out, for example, using a spectrophotometer equipped with an integrating sphere, the measurement at a given thickness subsequently being converted, if appropriate, to the reference thickness of 4 mm according to the standard ISO 9050:2003.

The optical system according to the invention may be integrated into a glazed unit, especially a monolithic or laminated (flat and/or curved) one, and the optical system forms a strip, especially a peripheral strip, over a portion of a main face of the glazed unit.

It is possible to use the optical system according to the invention as defined above in a vehicle or building.

It may be used especially as:
internal partition (between two rooms or in one space) in a building, in a road, rail, marine or airborne vehicle (between two compartments, in a taxi, bus, train, etc.), especially as a glazed shower or bathtub wall,
glass door (entrance door or service door), window (single, double, triple glazing), ceiling, tiling (floor or ceiling), toilet door, a glazed part of home or street furniture
glazed unit for a motor vehicle (car, truck, bus, coach, etc.) which is therefore a road, rail, marine (boat) vehicle, windscreen, side glazing, roof, etc.
projection or backprojection screen,
store window, window especially for a booth.

Of course, it may form all or part of a glazed unit (a partition and window of transom type, etc.).

A building glazed unit can therefore be bearing the optical system as described previously, especially a monolithic, double or triple glazed unit (with or without laminated glazing) partition, window, etc.

A vehicle glazed unit, especially for a road vehicle, can therefore bear the optical system as described previously, in particular windshield (the optical system forming one or more peripheral band(s)), sunroof, (monolithic or laminated) side glazed unit, especially a quarter-glass.

The laminated glazed unit according to the invention, in particular for a private car (windscreen etc.) or truck, can be curved (bent) in one or more directions particularly for the first sheet, the second sheet and a radius of curvature of 10 cm to 40 cm. It can be flat for buses, trains, tractors.

The optical system according to the invention may be integrated within a laminated and especially curved glazing, is between the first and second glazed units, respectively called exterior and interior glazed units, and forms a peripheral strip over an upper portion of the glazed unit, the edge face referred to as external of the stack being masked from the outside by a first opaque peripheral layer, especially an enamel over the external glazed unit (preferably on face F2), and/or the edge face referred to as internal of the stack being masked from the inside by a second opaque peripheral layer, especially an enamel over the internal glazed unit (on face F4 for example, or even face F3).

The curved laminated glazed unit according to the invention, especially windscreen or side glazed unit, can have a $T_L$—in the clear glass pane—which is preferably at least 70% and even at least 75% or even at least 80%.

The curved laminated glazed unit according to the invention, especially sunroof, can have a light transmission $T_L$ of at most 10% and even of 1 to 6%.

For a motor vehicle roof, at least one, or all, of the following criteria are preferred:
an energy transmission $T_E$ of at most 10% and even of 4 to 6%,
an energy reflection $R_E$ (preferably face F1 side) of at most 10%, better still of 4 to 5%,
and a total transmission of the solar energy TTS<30% and even<26%, even from 20 to 23%.

The bending of the first and second glazed units (especially windshield) can be in one or more directions, for example described in the document WO2010136702.

In order to limit heating in the passenger compartment or to limit the use of air conditioning, one of the glazed units at least (preferably the exterior glass) is tinted, and the laminated glazed unit can also comprise a layer which reflects or absorbs solar radiation, preferably on face F4 or on face F2 or F3, in particular a transparent electrically conductive oxide layer, known as a "TCO layer", (on face F4) or even a stack of thin layers including at least one TCO layer, or stacks of thin layers including at least one silver layer (on face F2 or F3), the or each silver layer being positioned between dielectric layers.

The optical system according to the invention may be used in combination with other electrically controllable devices such as those with electroluminescent systems (set of inorganic point-source LEDs, organic diodes or OLED, TFEL (with thin layers). Both may be facing or adjacent within a laminated glazed unit (of the lamination interlayer.

The optical system according to the invention may be used especially in a laminated glazed unit, in combination with another electrically controllable device such as an electroluminescent electrically controllable device, in particular LED, OLED, TFEL.

Other details and features of the invention will become apparent from the following detailed description given in relation to the following appended drawings, and in which:

FIG. 1 shows a schematic sectional view of an optical system 1001 composed of a first electrically controllable device 10 which has variable scattering and color by liquid crystals and dichroic dye and of a second electrically controllable device having variable polarization 100 by liquid crystals and dichroic dye 100 in a first embodiment of the invention.

FIG. 2 shows a schematic sectional view of an optical system 1002 composed of a first electrically controllable device 10 which has variable scattering and color by liquid crystals and dichroic dye and of a second electrically controllable device having variable polarization 101 by liquid crystals and dichroic dye 100 in a second embodiment of the invention.

FIG. 3 shows a schematic sectional view of an optical system 1003 composed of a first electrically controllable device 10 which has variable scattering and color by liquid crystals and dichroic dye and of a second electrically controllable device having variable polarization 102 by liquid crystals and dichroic dye 100 in a third embodiment of the invention.

FIG. 4 shows a schematic sectional view of an optical system 1000 composed of a first electrically controllable device 10 which has variable scattering and color by liquid crystals and dichroic dye and of a second electrically controllable device having variable polarization 100 by liquid crystals and dichroic dye 100 in a fourth embodiment of the invention.

FIG. 5 is a front view of electrodes in strips placed two by two used in the second device of FIG. 4.

FIG. 6 is a schematic partial view in perspective of the second device of FIG. 4 in a first functional state which is the off state.

FIG. 7 is a schematic partial view in perspective of the second device of FIG. 4 in a second state which is an on state at a given voltage U2.

Figure 10:
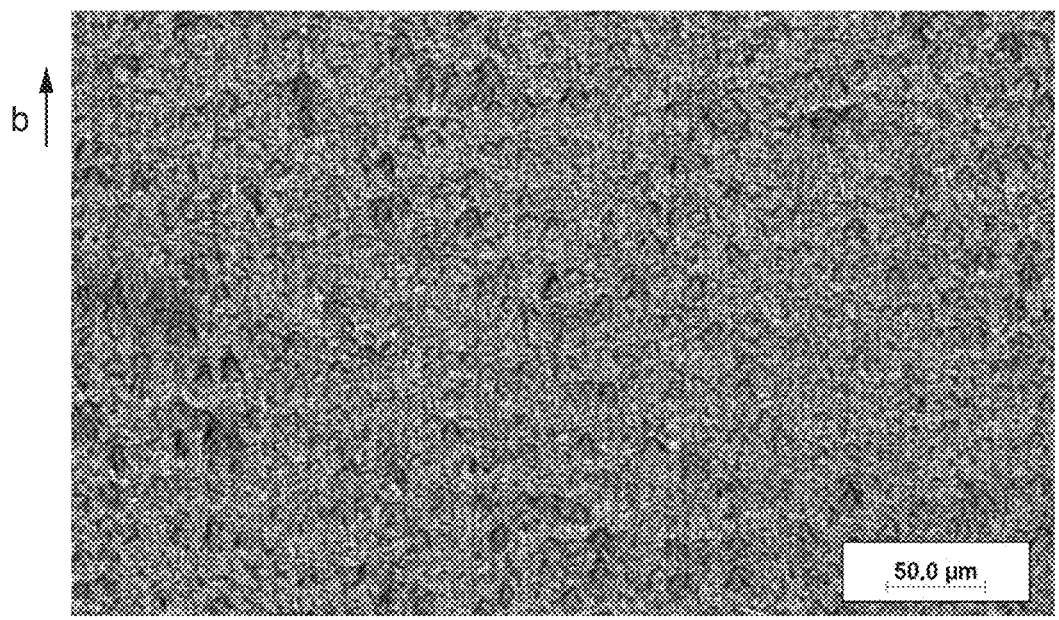
Figure 11:
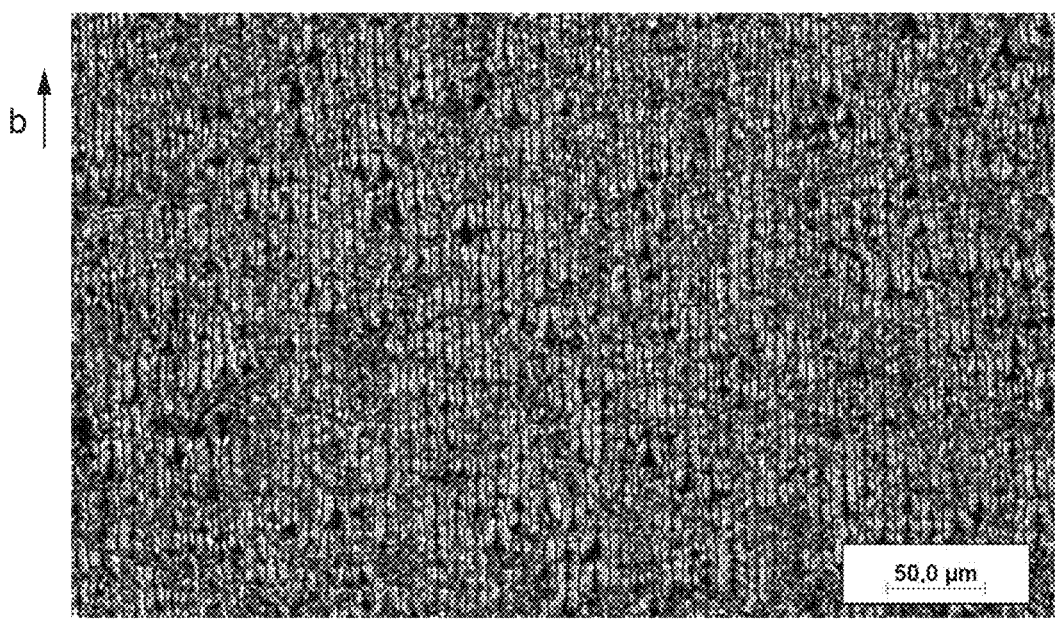
Figure 12:
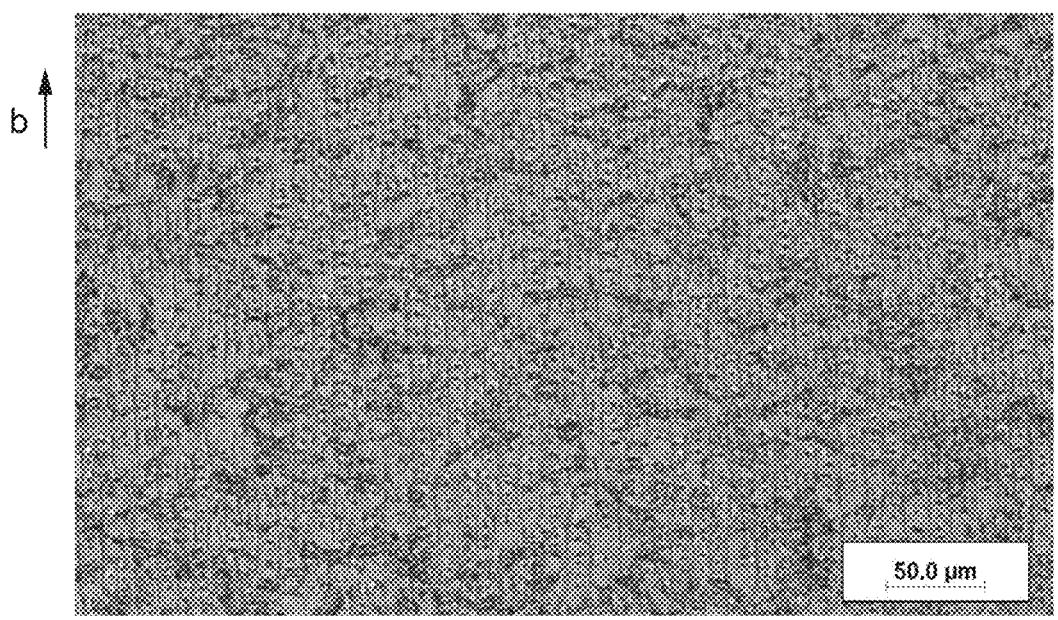

FIGS. 10, 11, and 12 show a front view of images (in black and white) obtained by polarized light optical microscopy (PLM) under polarizer with a magnification of 20× (with a 50 µm scale shown in white) of the first electroactive layer of the first electrically controllable device 10 of FIG. 4 (example 1) in the absence of said first electric field E1.

Figure 13:
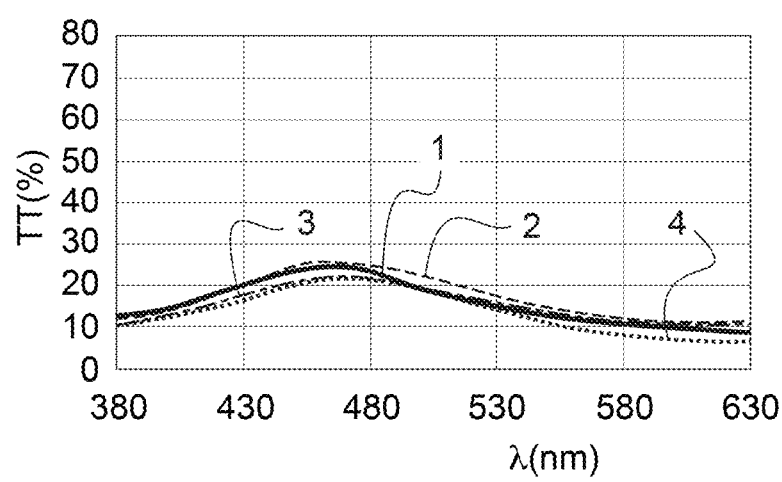

FIG. 13 shows a set of curves corresponding to the total transmission TT as a function of the wavelength between 380 and 630 nm in a variant of the optical system of FIG. 4 since P1 is perpendicular to b (second device rotated) 90°.

Figure 14:
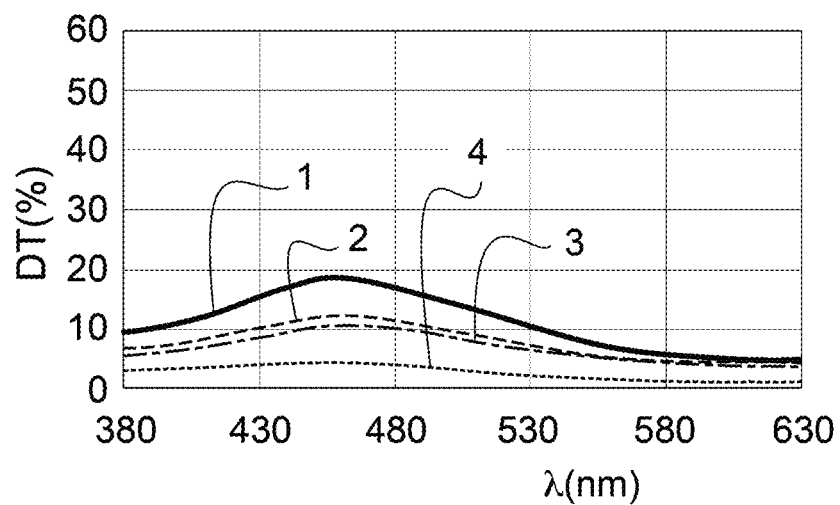

FIG. 14 shows a set of curves corresponding to the diffuse transmission DT as a function of the wavelength between 380 and 630 nm in a variant of the optical system of FIG. 4 since P1 is perpendicular to b (second device rotated) 90°.

Figure 15:
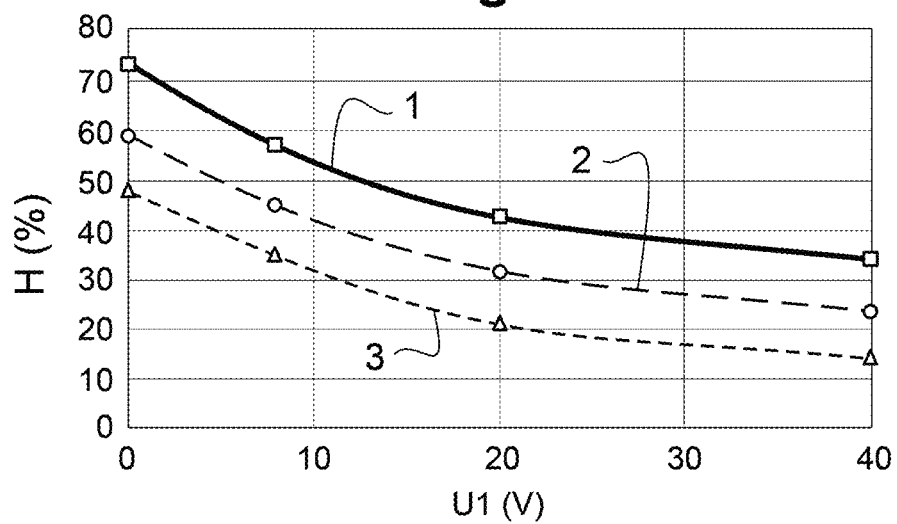

FIG. 15 shows a set of three curves corresponding to the haze H (%) as a function of the first voltage U1 of 0 to 40 V of the optical system of FIG. 4 (with U2 equal to 0 V).

FIG. 16 shows a set of three curves corresponding to the ratio of the diffuse transmission DT to the total transmission TT as a function of the wavelength between 380 and 630 nm of the optical system of FIG. 4 (in off-off mode of the optical system).

FIG. 17 shows a set of curves corresponding to the integrated light transmission LT as a function of the first voltage U1 of 0 to 40 V of the optical system of FIG. 4 (with U2 equal to 0 V).

Figure 18:
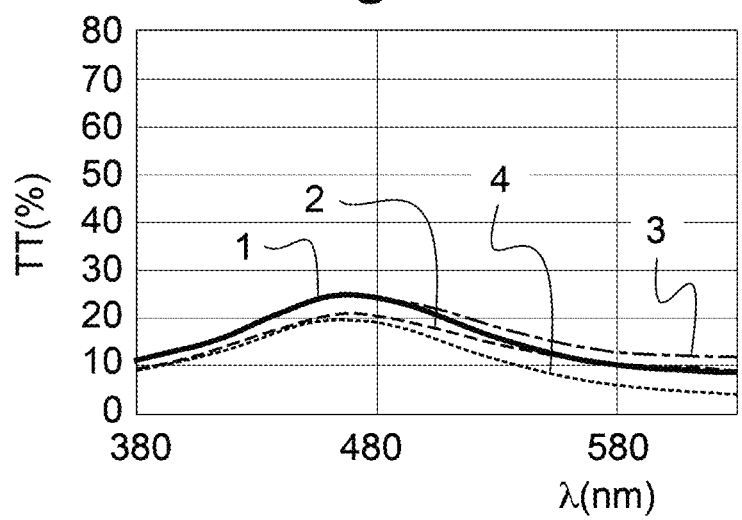

FIG. 18 shows a set of curves corresponding to the total transmission TT as a function of the wavelength between 380 and 630 nm of the optical system of FIG. 4 with P1 parallel to b.

Figure 19:
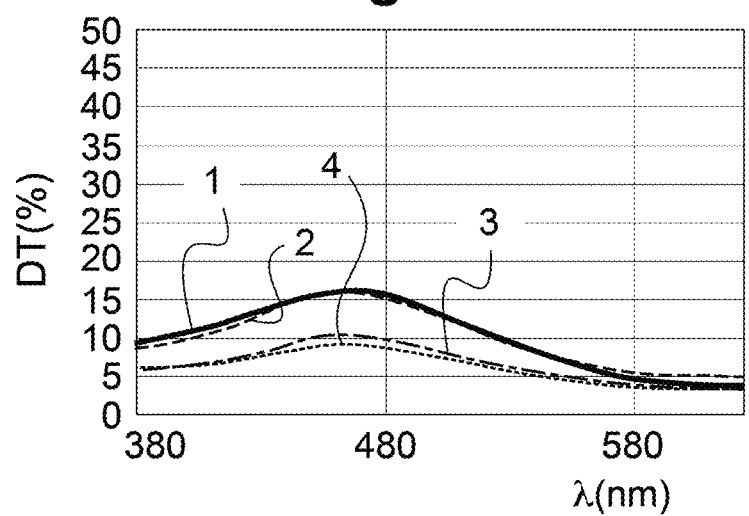

FIG. 19 shows a set of three curves corresponding to the diffuse transmission DT as a function of the wavelength between 380 and 630 nm of the optical system of FIG. 4 with P1 parallel to b.

Figure 20:
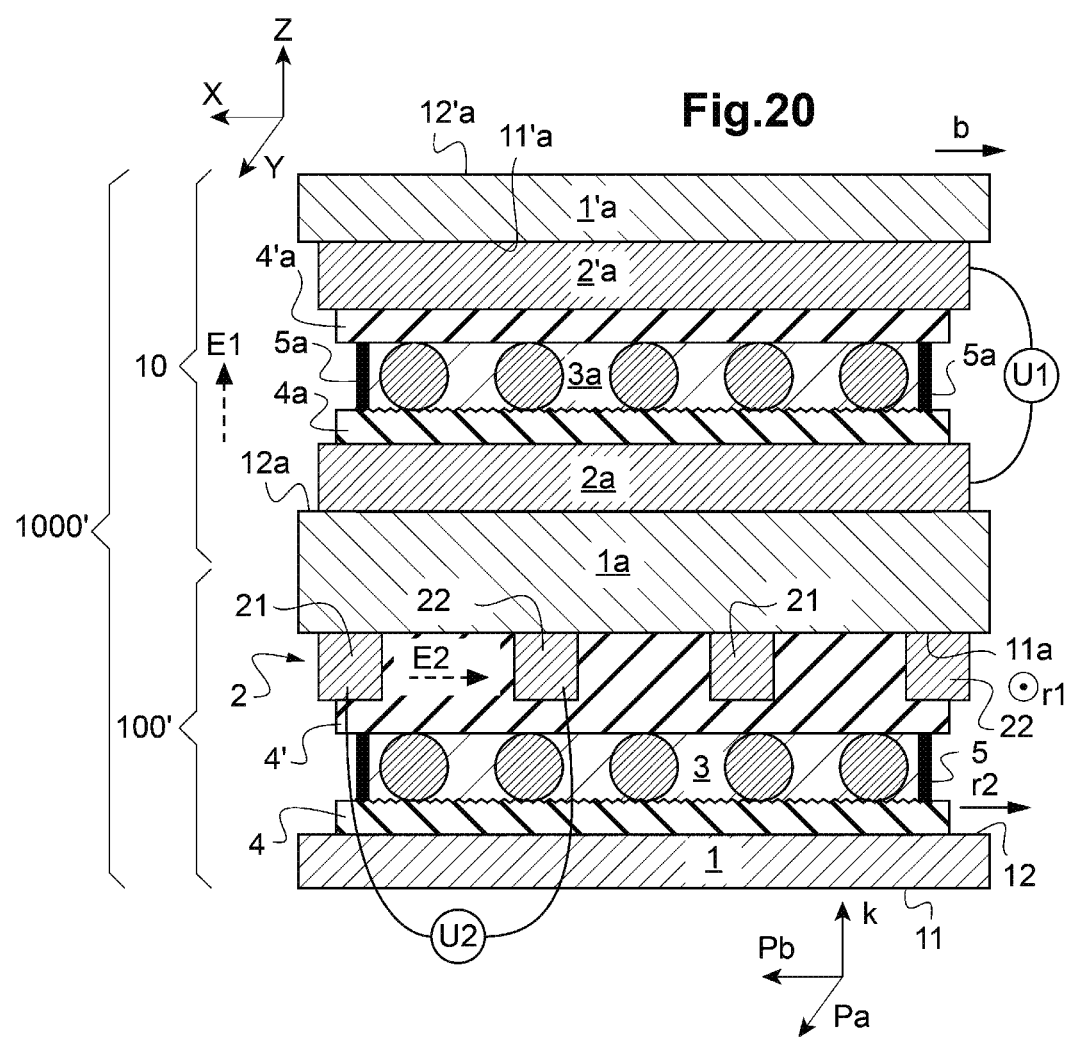

FIG. 20 shows a schematic sectional view of an optical system 1000 composed of a first electrically controllable device 10 which has variable scattering and color by liquid crystals and dichroic dye and of a second electrically controllable device having variable polarization 100' by liquid crystals and dichroic dye in a variant of the fourth embodiment of the invention.

Figure 21:
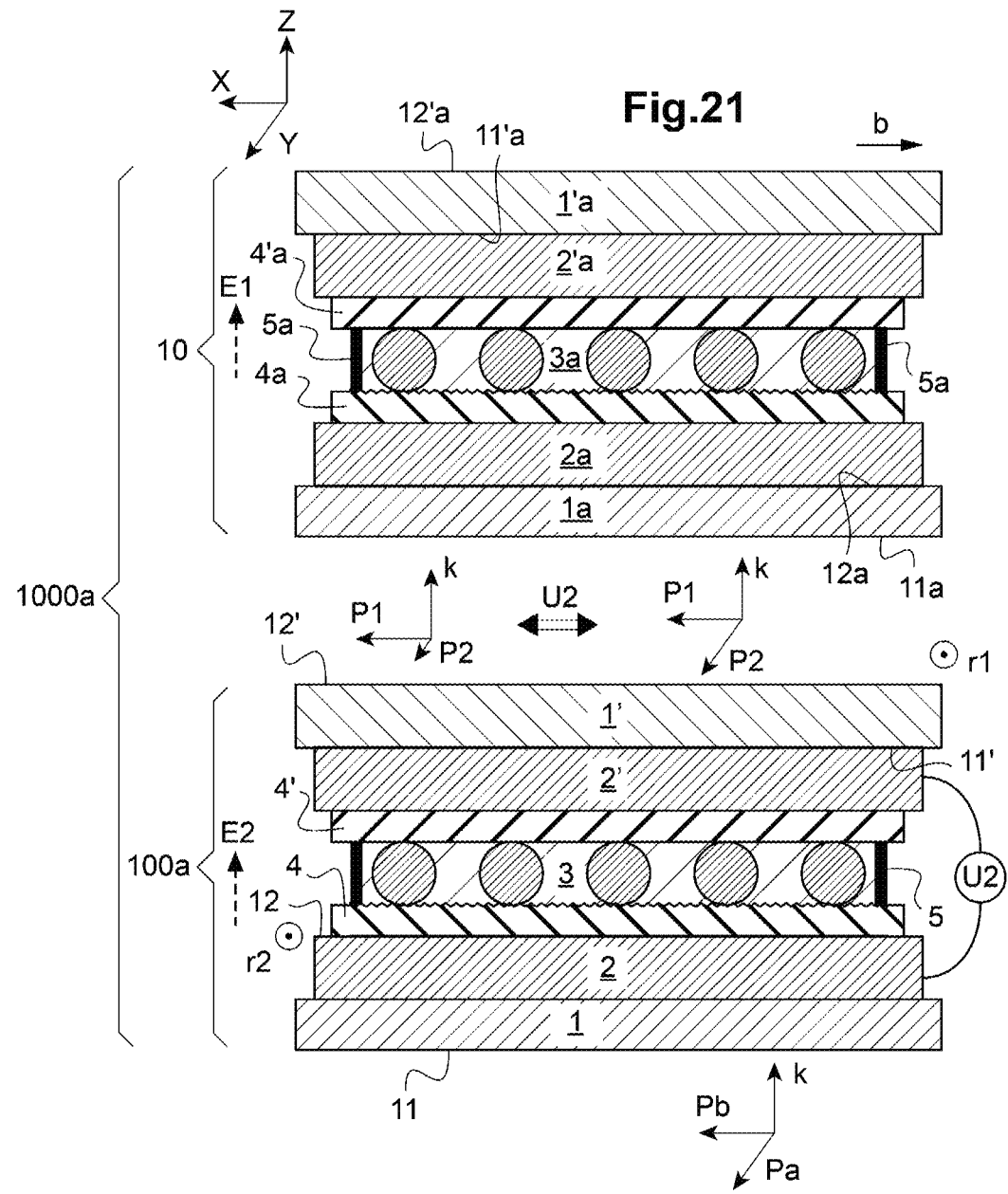

FIG. 21 shows a schematic sectional view of an optical system 1000a composed of a first electrically controllable device 10a which has variable scattering and color by liquid crystals and dichroic dye and of a second electrically controllable device having variable polarization 100a by liquid crystals and dichroic dye 100 in a fifth embodiment of the invention.

Figure 22:
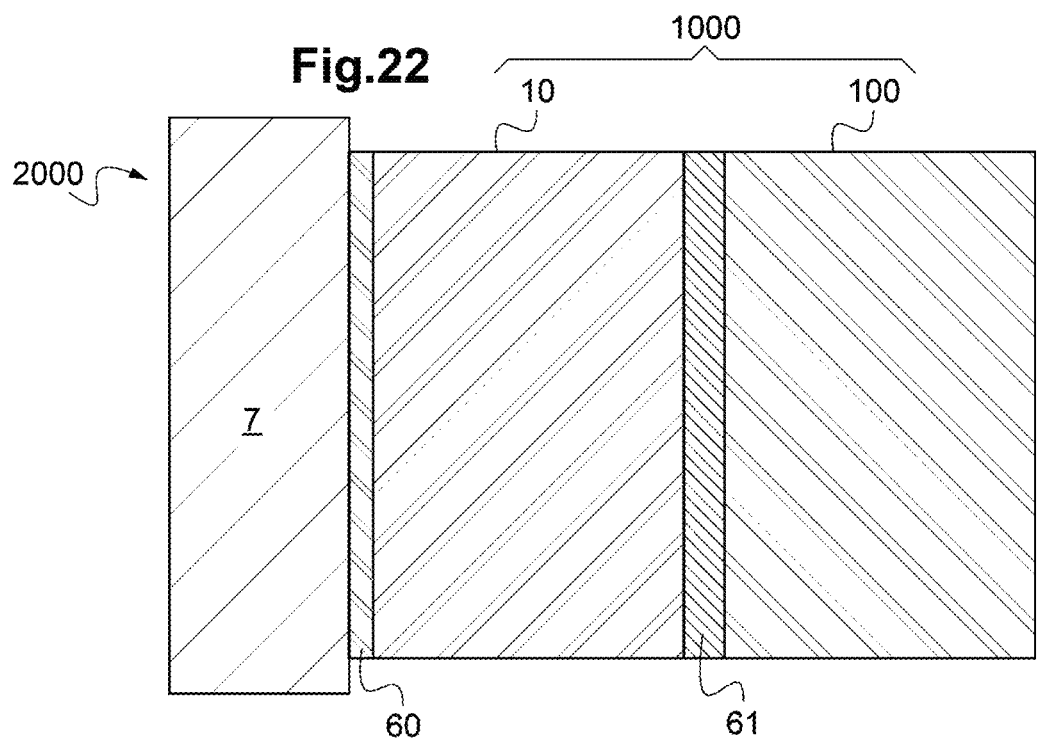

FIG. 22 shows a schematic sectional view of a glazed unit 2000 bearing an optical system 1000 according to the invention.

Figure 23:
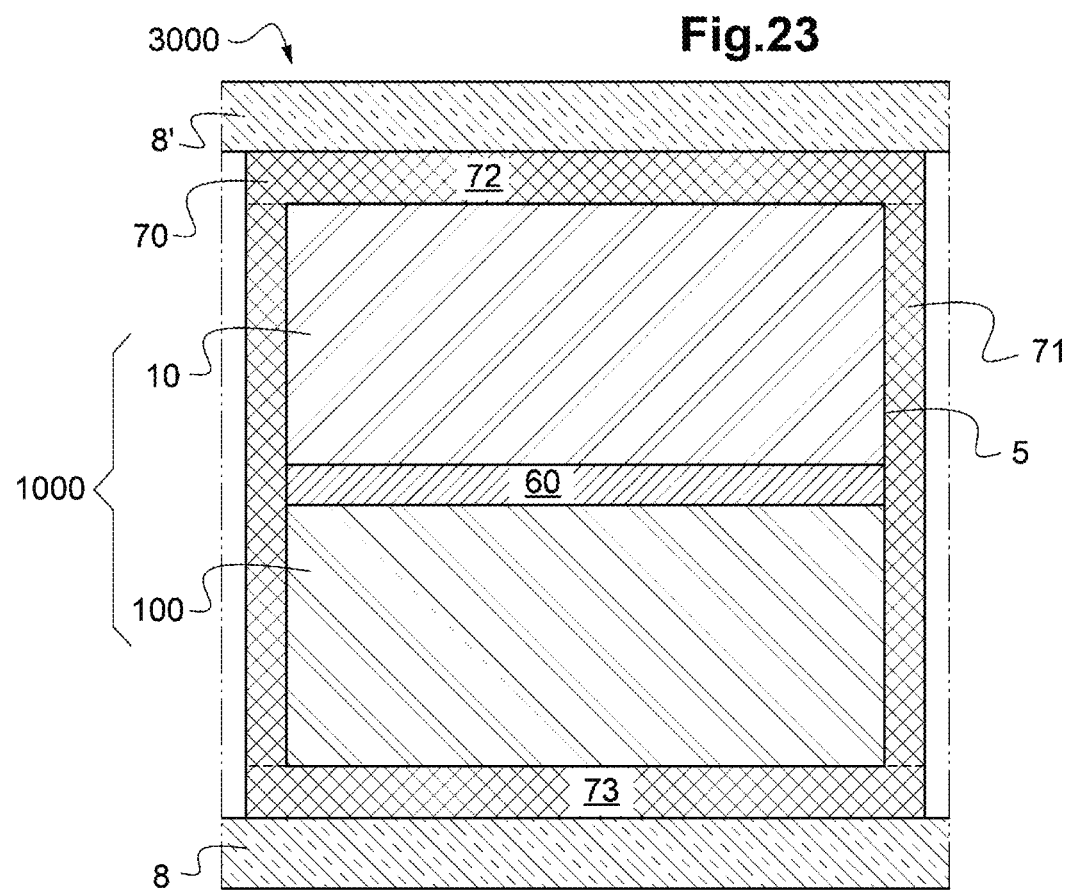

FIG. 23 shows a schematic sectional view of a laminated glazed unit 3000 bearing an optical system 1000 according to the invention.

Figure 24:
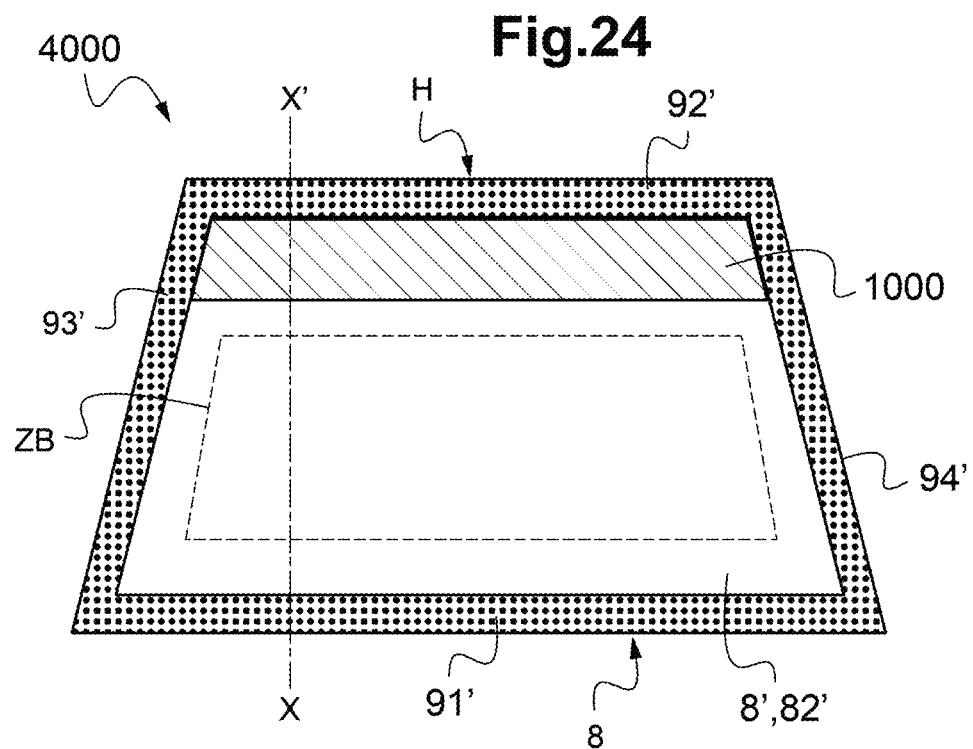
Figure 25:
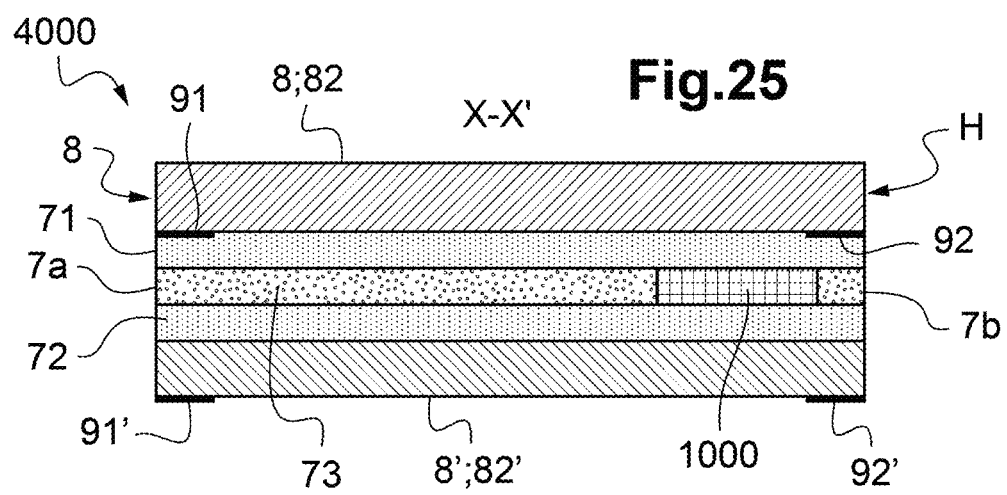

FIGS. 24 and 25 show, respectively, a front view and a schematic sectional view of a laminated glazed unit 4000 bearing an optical system 1000 according to the invention.

The elements shown in the figures are not to scale.

Figure 1:
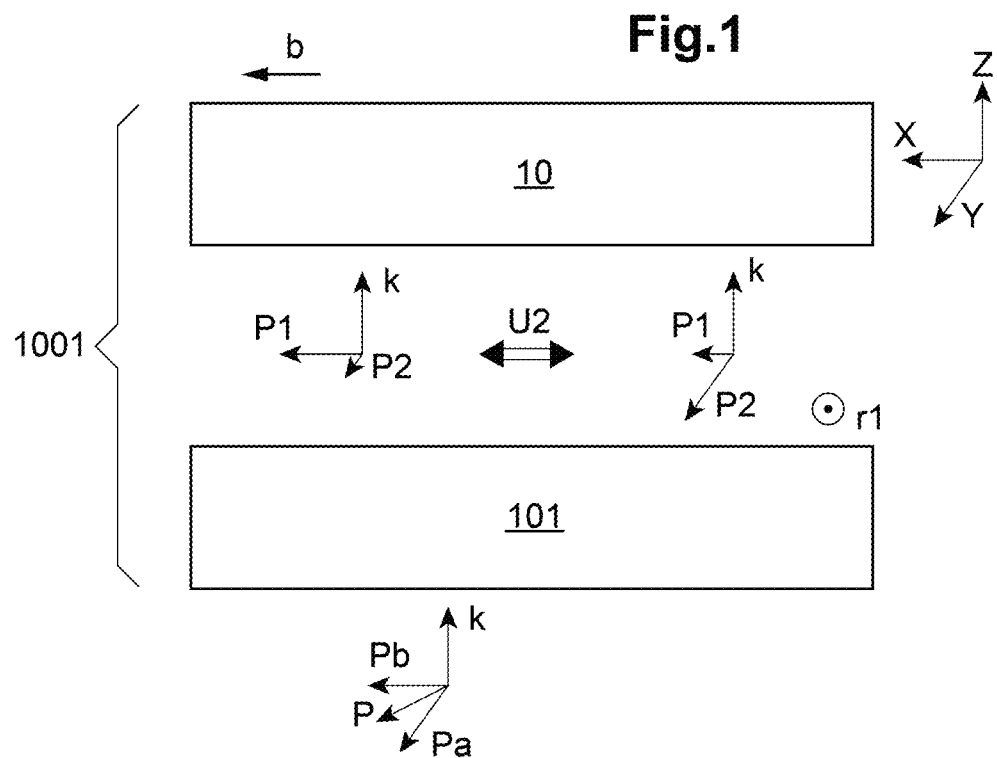

FIG. 1 shows a schematic sectional view of an optical system 1001 composed of a first electrically controllable device 10 which has variable scattering and color by first liquid crystals and first dichroic dye and of a second electrically controllable device having variable polarization 101 by second liquid crystals and second dichroic dye in a first embodiment of the invention.

Here the first electrically controllable device 10 is characterized by a first surface anchoring direction b of the first liquid crystals (in the off state).

An orthonormal reference frame X, Y, and Z is defined. b is along the axis X.

The second electrically controllable device 101 is here characterized by a first direction r1 of anchoring a surface of the second liquid crystals (in the off state) on the output side toward the first device 10 and even by a second direction r2 of anchoring a surface of the second liquid crystals on the opposite side, therefore on the input side of the first device.

The second device 101 has first and second functional states and:
in the first functional state which is the off state here, from an unpolarized incident light on the side opposite the first device (represented schematically by normal components Pa and Pb of the same intensity, with k the propagation vector of the light along Z), the second device 101 is able to deliver a polarized output light on the side of the first device 10 with a first component of the polarized electric field P1 along an axis X and a second component of the polarized electric field P2 along an axis Y normal to Y, with a first polarization ratio defined by $$rp1 = \frac{T1}{T1+T2} \qquad \text{[Math 3]}$$

rp1 preferably being at least 70% or 90%, and even at least 95% T1 being the total transmission at a wavelength between 380 and 800 nm along X and T2 being the total transmission along Y at the wavelength between 380 and 800 nm for a first voltage U2a between the third and fourth given electrodes that is preferably zero, (P1 is therefore ultra-dominant with respect to P2)

and in the second functional state which here is an on state, at voltage U2 (between two electrodes preferably in coplanar strips, two-by-two):

i) from an unpolarized incident light opposite to the first device, the second device 101 being able to deliver a polarized output light on the side of the first device with a second polarization ratio defined by $$rp2 = \frac{T'2}{T'1+T'2} \quad [\text{Math 4}]$$

rp2 being at least 30%, and even at least 50% or 60% T'1 being the total transmission at a wavelength between 380 and 800 nm along the first axis and T'2 being the total transmission along the second axis at the wavelength between 380 and 800 nm for a second voltage U2b between the third and fourth electrodes, which is non-zero, U2b being distinct from U2a. P2 is preferably predominant relative to P1.

The polarization of the output light of the second device may be elliptical.

Naturally, the second device then has a multitude of functional states in the on state. There is in particular a threshold voltage from which the anchoring force of the second liquid crystals is overcome for a part of the liquid crystals and the more the voltage is increased, the more the liquid crystals reorient up to a saturation voltage which is preferably at most 80 V.

It is then possible to have a polarization ratio $$r(U2) = \frac{T2}{T1+T2}$$

which varies according to the voltage U2 applied.

The first electrically controllable device 10 includes a first electroactive layer which has an optical response depending on the state of polarization of an incident light on the first device, the optical response will vary depending on whether b is normal or parallel to P1.

Figure 2:
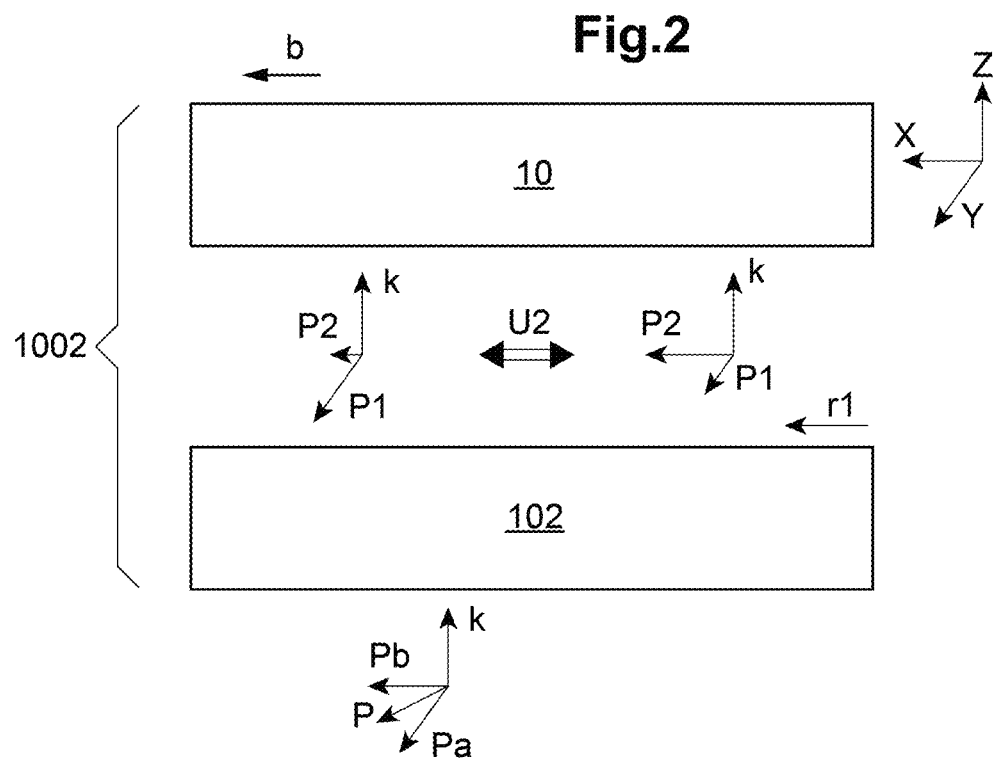

FIG. 2 shows a schematic sectional view of an optical system 1002 composed of a first electrically controllable device 10 which has variable scattering and color by first liquid crystals and first dichroic dyes and of a second electrically controllable device having variable polarization 101 by second liquid crystals and second dichroic dyes 102 in a second embodiment of the invention.

The system 1002 differs from the previous one in that the second device 102 (for example which has rotated) 90° has a direction r1 parallel to b, in other words P1 is normal to b.

FIG. 3 shows a schematic sectional view of an optical system 1003 composed of a first electrically controllable device 10 which has variable scattering and color by first liquid crystals and first dichroic dyes and of a second electrically controllable device having variable polarization 103 by second liquid crystals and second dichroic dyes 103 in a third embodiment of the invention.

The system 1003 differs from the first system 1001 103 in that, in the second on state, from an unpolarized incident light on the side opposite to the first device, the second device is able to provide an unpolarized output light on the side of the first device.

The following examples provide more details regarding the possible structure of the first and second devices and even their assembly.

FIG. 4 shows a schematic sectional view of an optical system 1000 composed of a first electrically controllable device 10 which has variable scattering and color by first liquid crystals and first dichroic dyes and of a second electrically controllable device having variable polarization 100 by liquid crystals and dichroic dye 100 in a fourth embodiment of the invention.

First Device

The first device 10 includes a stack of layers (physical, solid) in this order:

- a transparent dielectric support 1'a with an edge face and main faces 11'a and 12'a, herein a glass of 1.1 mm—or as a plastic variant, such as PET
- a first transparent electrode 2'a with a first main surface referred to as connecting surface SA1 and with a surface referred to as opposite surface SB and an edge face, which transparent electrode is an indium tin oxide ITO layer with a sheet resistance of 100 ohm/square, more broadly between 5 and 300 ohm/square, and, for color neutrality, this or each electrode may also comprise at least two dielectric thin underlayers under the ITO layer and even one or two (dielectric) overlayers
- a first transparent normal planar anchoring layer 4'a (on the first electrode 2'a)
- in contact with the first anchoring layer 4'a, a colored dielectric electroactive layer 3a with a main face referred to as face FA1 on the connecting surface SB side and a main face referred to as opposite face FA2, herein of thickness Ep0 (less than 20 µm) made of a first material including:

first liquid crystals polymers forming a polymeric network, the liquid crystals being stabilized by the polymeric network, one or more first dichroic dyes (in the dissolved state) the first material exhibiting, from a temperature referred to as T1, a mesophase referred to as P wherein the material comprises a set of domains, herein sub-millimetric domains which comprise two-dimensional topological defects such as line defects and under T1 a mesophase P' spacers being distributed in the material, herein glass beads layer 3a being sealed at the periphery by a polymeric seal 5a for example made of epoxy acrylate, herein of cyanoacrylate

- a second transparent anchoring layer 4a, here unidirectional anchoring in a direction b parallel to X
- a second transparent electrode 2a with, on face A2 aaside, a main surface referred to as second connecting surface SA2 and with a surface referred to as opposite surface SB2, especially which second electrode 2a is an ITO layer with a sheet resistance of 100 ohm/square, more broadly between 5 and 300 ohm/square, and, for color neutrality, this or each electrode may also comprise at least two dielectric thin underlayers under the ITO layer and even one or two overlayers a transparent dielectric support 1*a* of the second electrode 2*a* with an edge face and main faces 11*a* and 12*a*, herein a glass of 1.1 mm—or as a variant plastic, such as PET- For the power supply via an electrical source, conductive tapes (not shown), especially metallic conductive tapes, for example made of copper, are fixed by adhesive bonding along and on the peripheral edges and are in contact with the electrodes 2'*a*, 2*a* (one tape per electrode, the tapes being preferably on opposite edges). These tapes are then connected to a power supply. The edge faces of the electrodes 2'*a*, 2*a* and the edge of the electroactive layer are preferably set back relative to the edges of the rectangular (glass) or otherwise shaped substrate and support 1*a*, 1'*a*. The thicknesses of the (glass) substrate and support 1*a*, 1'*a* may for example be 0.7 mm to 4 mm. They may be of a thickness preferably of greater than 100 μm and of at most 300 μm for better mechanical strength of the assembly and/or ease of use and handling, but if more flexibility is desired, it is possible to go down for example to 50 μm.

The production process is described more precisely below.

The first anchoring layer 4'*a* is an octyltrichlorosilane (OTS) layer. It is obtained by submerging the glass with the second ITO 2' in a 10 nM OTS solution in n-heptane for 30 minutes, rinsing in deionized water and drying under nitrogen. The first anchoring layer 4'*a* causes normal (homeotropic) surface anchoring of the liquid crystals (with no electric field) in contact with this first anchoring layer 4'*a*.

Under said electric field E1, the first device 10 will exhibit a diffuse transmission, a haze and a color which vary with the voltage.

The second anchoring layer 4*a* is deposited on the second ITO layer 2*a* by spin coating a solution of polyvinyl alcohol (PVA; Sigma-Aldrich; molecular weight 27 kDa) of about 1 μm in deionized water (9.1% by weight of PVA). Before the deposition, the ITO is preferably cleaned (surfactant), rinsed in deionized water and dried under nitrogen.

The second anchoring layer 4*a* is then rubbed along the first direction b for a unidirectional planar anchoring along this first direction b of the first liquid crystals at the surface (outside the field) in contact with this layer 4*a*.

The first electroactive layer 3*a* is composed of a mixture including a blue dichroic dye called M412 sold by Mitsui Chemicals having as maximum absorption wavelength 630 n±10 nm.

The first electroactive layer 3*a* is polymerized using a monomer, herein mesogenic, forming the stabilizing polymeric network such as 1,4-bis [4-(3-acryloyloxylxyloxy) benzoyloxy]-2-methylbenzene ST03021 (sold by Synthon Chemicals) of formula $C_{33}H_{32}O_{10}$.

A mixture of liquid crystals composed of 4-octyl-4-cyanobiphenyl (8CB from Tokyo Chemicals) and 4-cyano-4'-pentylbiphenyl (5CB sold by Tokyo Chemicals) (which does not have a smectic phase) is used.

More precisely, to produce the colored electroactive layer 3*a*, a mixture is formed with these two types of liquid crystals, 5CB and 8CB, the monomer, the dichroic dye, and a photoinitiator 2,2-dimethoxy-2-phenylacetophenone, called DPMA.

The mixture contains:
95.4% by weight of the liquid crystals 5CB and 8CB in the ratio 1 g of 5CB for 4 g of 8CB
2% by weight of monomer ST03021,
2% by weight of dichroic dye M412,
0.6% by weight of photoinitiator DPMA, The initial mixture before polymerization hereinbefore exhibits a smectic A mesophase P' under a temperature of approximately 12±2° C. and a nematic mesophase P between approximately 12±2° C. and approximately 43±2° C. (and an isotropic phase beyond approximately 43±2° C.).

The final mixture (after polymerization) exhibits a smectic A mesophase P' under a modified temperature T1 of approximately 16±2° C. with a nematic mesophase P between 16±2° C. and 41±2° C. (and an isotropic phase beyond 41±2° C.).

A layer of this colored mixture is formed over a thickness of approximately 10 μm between the anchoring layers 4*a* and 4'*a*.

Next, the assembly is illuminated under UV ($\lambda$=365 nm) for polymerization at 3° C. (or at least under 12° C.), therefore in smectic A phase.

The colored electroactive layer 3*a* then includes in nematic phase domains which are comparable to the focal conic domains of the smectic A phases, in particular herein non-TFCD domains. These defect domains each comprise two defect lines (two line defects), focal conic domains which go in pairs, the first elliptical with different degrees of eccentricity and the second hyperbolic. The given name is EHFCD.

Second Device

The second device 100 comprises a stack of (solid) layers in this order:
a first transparent dielectric element 1' with main faces 11' and 12' here a glass 1.1 mm thick—or in one variant, plastic such as PET
third and fourth transparent electrodes in separate strips 2 including first strips 21 and second strips 22 between insulating strips 23,-ITO strips with sheet resistance 100 ohm/square, more broadly between 5 and 300 ohm/square
a third unidirectional planar anchoring layer 4' in a direction r1 perpendicular to b and to X, on the first transparent dielectric element 1' (face 11') and on the ITO strips 21, 22
in contact with this third anchoring layer 4', a second dielectric electroactive layer 3 with a main face referred to as face FA3 on the side of the first device and a main face referred to as opposite face FA4, herein of thickness (less than 20 μm) made of a second material including:
second liquid crystals
one or more second dichroic dyes (in the dissolved state)
spacers being distributed in the material, herein glass beads
layer 3 being sealed at the periphery by a polymeric seal 5 for example made of epoxy acrylate, herein of cyanoacrylate
a fourth transparent anchoring layer 4, here unidirectional anchoring in a direction r2 perpendicular to r1, parallel to X
a second transparent dielectric element 1 (of layer 4) with main faces 11 and 12, here a glass 1.1 mm thick—or in one variant, plastic such as PET For the power supply via an electrical source, conductive tapes (not shown), especially metallic conductive tapes, for example made of copper, are fixed by adhesive bonding along and on the peripheral edges and are in contact with the electrodes 21, 22 (one tape per electrode, the tapes being preferably on opposite edges). These tapes are then connected to a power supply. The edge faces of the electrodes 21, 22 and the edge of the second electroactive layer are preferably set back relative to the edges of the rectangular (glass) or otherwise shaped elements 1, 1'. The thicknesses of the (glass) elements 1, 1' may for example be 0.7 mm to 4 mm. They may be of a thickness preferably of greater than 100 μm and of at most 300 μm for better mechanical strength of the assembly and/or ease of use and handling, but if more flexibility is desired, it is possible to go down for example to 50 μm.

The production process is described more precisely below.

The third anchoring layer 4' is therefore a layer inducing a unidirectional planar anchoring in a direction r1 of the second liquid crystals at the surface (outside the field) in contact with this layer 4.

The third anchoring layer 4' is deposited on the ITO strips 21 and 22 and between the strips 23, called insulating strips, on the first element 1' by spin-coating a solution of polyvinyl alcohol (PVA; Sigma-Aldrich; molecular weight 27 kDa) approximately 500 nm thick.

The third anchoring layer 4' is then rubbed in the direction r1 parallel to the strips 21, 22 extending in a direction r0//to r1.

The fourth anchoring layer 4' is therefore a layer inducing a unidirectional planar anchoring in a direction r2 of the second liquid crystals at the surface (outside the field) in contact with this layer 4.

The fourth anchoring layer 4 is deposited on the second element 1 by spin-coating a solution of polyvinyl alcohol (PVA; Sigma-Aldrich; molecular weight $M_w$~27 kDa) of approximately 300 nm. The fourth anchoring layer 4 is then rubbed in the direction r2 normal to r1.

The second electroactive layer of liquid crystals 3 is composed of the nematic liquid crystals E7 (98% by weight) with a black dichroic dye called S428 sold by Mitsui Chemicals (2% by weight). The thickness of the second electroactive layer is 10 μm.

FIG. 5 is a front view of electrodes in strips 21, 22 and two by two used in the second device of FIG. 4.

For example, the insulating strips 23 form a serpentine arrangement and a first zone of the electroconductive layer is isolated with a second zone of the layer by a first portion 23a of the first insulating strip of the coil and by a last portion 23b of the last insulating strip of the coil.

The electrically conductive strips 21 and 22 are parallel to r0 and r1.

It is possible to provide this arrangement of insulating strips by removing a full electrically conductive layer, especially by a femtosecond laser beam, for example with a diameter of 30 μm and the strips being 15 μm. The strip thickness limit is given by the size of the laser beam. The limit of the interstrip distance is dictated by the movement of the laser beam.

The first and second liquid crystals exhibit positive dielectric anisotropy here.

As explained in relation to principle FIG. 1, the second device 100 which receives a polarized light as input, delivers either in the first off state a light polarized mainly along P1 normal to r1 (parallel to b) or in a second state, a light polarized mainly along P2 normal to P1 (normal to b).

FIG. 6 is a schematic partial view in perspective of the second device of FIG. 4 in the first state which is the off state.

At the surface of the fourth anchoring layer 4, the second liquid crystals 312 (defined by the director n2) and dichroic dyes 322 are (generally) parallel to r2.

At the surface of the third antagonistic anchoring layer 4, the second liquid crystals 310 (defined by the director n1) and dichroic dyes 320 are (generally) parallel to r1.

This antagonism forces the second nematic liquid crystals to undergo a torsional deformation and the second dichroic dyes are controlled by the nematics.

In the thickness of the second electroactive layer 3, the second liquid crystals 311 (defined by the director n3) and second dichroic dyes 321 form an angle (generally) with r1 and r2.

FIG. 7 is a principle schematic partial view in perspective of the second device of FIG. 4 in the second state which is an on state at a given voltage U2.

At the surface of the fourth anchoring layer 4, the second liquid crystals 312 (defined by the director n2) and dichroic dyes 322 remain (generally) parallel to r2.

In the thickness of the second electroactive layer 3, the second liquid crystals 311 (defined by the director n3) and second dichroic dyes 321 generally tend to be aligned along r2.

At the output, the polarization P1p perpendicular to r1 decreases and may be quasi-off.

Figure 8:
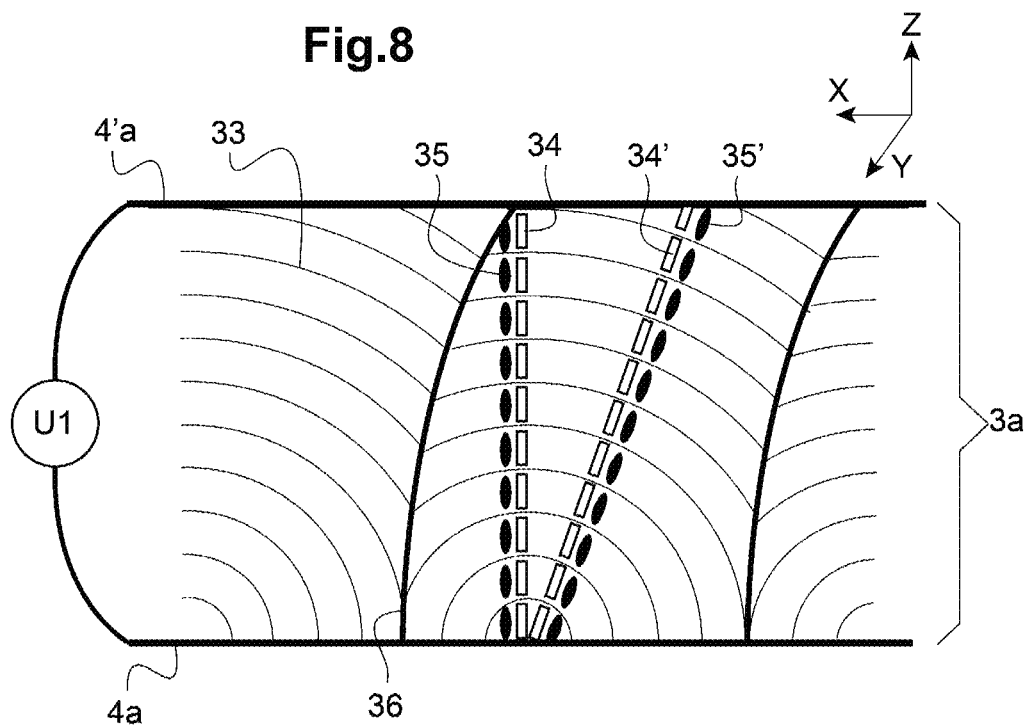
FIG. 8 shows a schematic and detail sectional view of the electroactive layer between two planar electrodes of the first device 10 outside the electric field, schematically illustrating the orientation of certain liquid crystals and some of the dichroic dyes without an electric field E1.

FIG. 8 shows a schematic and detail sectional view of the electroactive layer 3 between two planar-planar electrodes of the first device outside the electric field, schematically illustrating the orientation of certain first liquid crystals 34, 34' and of some of the first dichroic dyes 35, 35' without an electric field E1.

FIG. 8 shows a layered structure 36 of the liquid crystals with the dichroic dyes, the structure fixed by the polymeric network not shown.

The layers of liquid crystals are curved toward the planar anchoring layer (herein degenerate) in a central zone 34 and the layers are planar and parallel to one another in two lateral zones which are more or less spread apart and which may be non-existent.

In the first electroactive layer 3a there are existing defect domains each comprising two defect lines (two line defects), which are focal conic domains and go in pairs, especially one elliptical (in the plane X, Y) and the other hyperbolic (line 36 in bold line), thus the given name is "Elliptic-Hyperbolic focal conic domain" or EHFCD.

A first series of first liquid crystals (rods) 34 are perpendicular to the anchoring layers 4a 4'a, therefore along Z. The same applies to some first dichroic dyes 35 present in this zone.

A second series of first liquid crystals 34' form an angle with respect to this anchoring layer 4a. The same applies for certain other dichroic dyes 35'.

Figure 9:
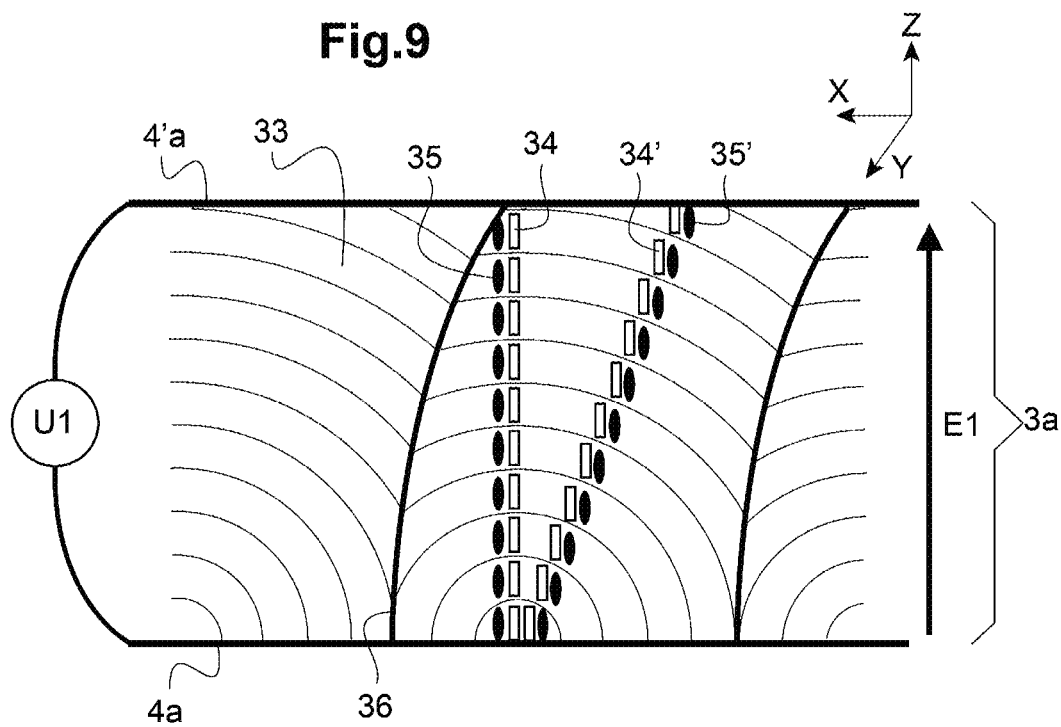
FIG. 9 shows a schematic and detail sectional view of the electroactive layer between two planar-planar electrodes of the first device 10 in the electric field E1, schematically illustrating the orientation of certain liquid crystals and some of the dichroic dyes in said electric field E1.

FIG. 9 shows a schematic and detail sectional view of the electroactive layer between two planar-planar electrodes of the first device in the electric field E1, schematically illustrating the orientation of certain first liquid crystals 34, 34' and of some of the first dichroic dyes 35, 35' in said first electric field E1.

In the field, the second series of first liquid crystals 34' tend to be also perpendicular to the anchoring layers 4a, 4'a, therefore along Z. The same applies for certain other dichroic dyes 35'.

FIGS. 10, 11, and 12 show a front view of images (in black and white) obtained by polarized light optical microscopy (PLM) under polarizer with a magnification of 20× (with a 50 μm scale shown in white) of the first electroactive layer of the first electrically controllable device 10 of FIG. 4 (example 1) in the absence of said electric field E1.

FIG. 10 is for a polarized light incident on the first device which has a linear polarization Pi in a direction parallel to b.

FIG. 11 is for a polarized light incident on the first device which has a linear polarization Pi in a direction perpendicular to b.

FIG. 12 is for a polarized light incident on the first device which has a linear polarization Pi in a direction perpendicular to b and by adding an analyzer perpendicular to this polarization Pi.

It can be seen that the EHFCD focal conic domains form a linear network parallel to the direction b.

FIG. 13 shows a set of curves corresponding to the total transmission TT as a function of the wavelength between 380 and 630 nm in a variant of the optical system of FIG. 4 since P1 is perpendicular to b (second device rotated) 90°)

Curve 1 is off+off mode (with a first voltage U1 at 0 V and a second voltage U2 at 0 V).

Curve 2 is on+off mode (with a first voltage U1 at 40 V and a second voltage U2 at 0 V).

Curve 3 is off+on mode (with a first voltage U1 at 0 V and a second voltage U2 at 40 V).

Curve 4 is on+on mode (with a first voltage U1 at 40 V and a second voltage U2 at 40 V).

FIG. 14 shows a set of curves corresponding to the diffuse transmission DT as a function of the wavelength between 380 and 630 nm in a variant of the optical system of FIG. 4 since P1 is perpendicular to b (second device rotated) 90°.

Curve 1 is off+off mode of the optical system (with a first voltage U1 at 0 V and a second voltage U2 at 0 V).

Curve 2 is on+off mode of the optical system (with a first voltage U1 at 40 V and a second voltage U2 at 0 V).

Curve 3 is off+on mode of the optical system (with a first voltage U1 at 0 V and a second voltage U2 at 40 V).

Curve 4 is on+on mode of the optical system (with a first voltage U1 at 40 V and a second voltage U2 at 40 V).

FIG. 15 shows a set of three curves corresponding to the haze H (%) as a function of the first voltage U1 of 0 to 40 V of the optical system of FIG. 4 (with U2 equal to 0 V).

The haze H which is the ratio between the light transmission integrated into the diffuse transmission DT.

Curve 1 is the haze measured when P1 is//to b.

Curve 2 is the haze measured when the incident light is not polarized.

Curve 3 is the haze measured when P1 is normal to b.

FIG. 16 shows a set of three curves corresponding to the ratio of the diffuse transmission DT to the total transmission TT as a function of the wavelength between 380 and 630 nm of the optical system of FIG. 4 (in off-off mode of the optical system).

FIG. 17 shows a set of curves corresponding to the integrated light transmission LT as a function of the first voltage U1 of 0 to 40 V of the optical system of FIG. 4 (with U2 equal to 0 V).

Curve 1 is the LT measured when P1 is // to b.

Curve 2 is the LT measured when the incident light is not polarized.

Curve 3 is the LT measured when P1 is normal to b.

FIG. 18 shows a set of curves corresponding to the total transmission TT as a function of the wavelength between 380 and 630 nm of the optical system of FIG. 4 with P1 parallel to b.

Curve 1 is off+off mode (with a first voltage U1 at 0 V and a second voltage U2 at 0 V).

Curve 2 is on+off mode (with a first voltage U1 at 40 V and a second voltage U2 at 0 V).

Curve 3 is off+on mode (with a first voltage U1 at 0 V and a second voltage U2 at 40 V).

Curve 4 is on+on mode (with a first voltage U1 at 40 V and a second voltage U2 at 40 V).

The total transmission varies little from one curve to another.

FIG. 19 shows a set of three curves corresponding to the diffuse transmission DT as a function of the wavelength between 380 and 630 nm of the optical system of FIG. 4 with P1 parallel to b.

Curve 1 is off+off mode (with a first voltage U1 at 0 V and a second voltage U2 at 0 V).

Curve 2 is on+off mode (with a first voltage U1 at 40 V and a second voltage U2 at 0V).

Curve 3 is off+on mode (with a first voltage U1 at 0 V and a second voltage U2 at 40 V).

Regarding example 1 described in relation with FIG. 4 (r1 perpendicular to b), in order to measure the color variation, the lightness L* and the parameters a* and b* measured from the total transmission and the integrated LT calculated from the total transmission (LT1) or the diffuse transmission (LT2), and the haze H, which is the ratio LT2/LT1, are calculated. Use is made of a spectrometer of Perkin Elmer Lambda 950 type.

The measurements and calculations are listed in Table 1.

TABLE 1

| U2/U1 (V) | LT1(%) | LT2 ((%) | H (%) | L | a | b |
|---|---|---|---|---|---|---|
| 0/0 | 9.7 | 7.1 | 73.7 | 37.3 | −4.2 | −21.3 |
| 0/40 | 13.7 | 4.5 | 32.8 | 43.8 | −3.8 | −11.3 |
| 40/0 | 14.3 | 7.8 | 54.4 | 44.7 | −4.4 | −16.5 |
| 40/40 | 16.6 | 5.2 | 31.1 | 47.7 | −4.1 | −12.1 |

The colorimetric deviation deltaE (between cases 0 V/0 V and 0 V/40 V) is 11.9.

Regarding one variant (r1 parallel to b), in order to measure the color variation, the lightness L* and the parameters a* and b* are calculated from the total transmission and the integrated LT calculated from the total transmission (LT1) or the diffuse transmission (LT2), and the haze H, which is the ratio LT2/LT1. Use is made of a spectrometer of Perkin Elmer Lambda 950 type.

The measurements and calculations are listed in Table 2.

TABLE 2

| U2/U1 (V) | LT1(%) | LT2 (%) | H (%) | L | a | b |
|---|---|---|---|---|---|---|
| 0/0 | 13.5 | 5.8 | 43.0 | 43.4 | −5.0 | −13.2 |
| 0/40 | 14.4 | 2.1 | 14.6 | 44.9 | −1.9 | −12.1 |
| 40/0 | 12.2 | 8.7 | 71.3 | 41.5 | −1.2 | −22.3 |
| 40/40 | 16 | 6.6 | 41.3 | 46.9 | −1.4 | −14.4 |

The colorimetric deviation deltaE (between cases 0 V/0 V and 0 V/40 V) is 3.6.

A first polarization ratio has been defined for polarization P1 (normal to r1) as follows:

$$r1(U2) = \frac{T1}{T1+T2}$$

A second polarization ratio has been defined for polarization P2 (parallel to r1 and normal to P1) as follows:

$$r2(U2) = \frac{T2}{T1+T2}$$

T1 being the averaged total transmission between 380 and 640 nm along the axis of P1 and T2 being the total transmission along the axis of P2 averaged between 380 and 640 nm. Use was made of a spectrometer of Perkin Elmer Lambda 950 type.

The curves of the ratios r1 and r2 as a function of the voltage U2 applied are indicated in Table 3.

TABLE 3

| U2 (V) | $r_1$ (%) | $r_2$ (%) |
|---|---|---|
| 0 | 99 | 1 |
| 20 | 49 | 51 |
| 40 | 32 | 68 |
| 60 | 26 | 74 |
| 80 | 22 | 78 |

At zero voltage, the polarization is essentially along P1.

As the voltage increases, component P2 increases.

FIG. 20 shows a schematic sectional view of an optical system 1000' composed of a first electrically controllable device 10 which has variable scattering and color by liquid crystals and dichroic dye and of a second electrically controllable device having variable polarization 100' by liquid crystals and dichroic dye in a variant of the fourth embodiment of the invention.

The optical system differs from the system of FIG. 4 in that the support 1'a is a common support form for the first and second devices (carrying all the electrodes on its two main faces).

FIG. 21 shows a schematic sectional view of an optical system 1000a composed of a first electrically controllable device 10a which has variable scattering and color by liquid crystals and dichroic dye and of a second electrically controllable device having variable polarization 100a by liquid crystals and dichroic dye 100 in a fifth embodiment of the invention.

The optical system 1000a differs from the system 1000 of FIG. 4 in that:
the third and fourth electrodes 2 and 2' are planar-planar (not coplanar)
r1 forms an angle of 0° with r2.

As a result, the output light of the second device is not polarized.

Assembly Examples

FIG. 22 shows a schematic sectional view of a glazed assembly 2000 including a transparent sheet 7 (any possible thickness) bearing an optical system 1000 according to the invention.

The first device 10 is bonded by an optical glue 60 to the transparent glass or plastic (rigid for example) sheet 7 and also is bonded by an optical glue 61 to the second device 100.

For example, this is a partition (vertical position).

The assembly may form part of a multiple glazed unit (double or triple glazed unit). For a double glazed unit, the system 1000 can be on face F1 side (external face by convention), F2, F3; F4 (internal face by convention). For a triple glazed unit, the stack may be on face F1 side (external face), F2, F3; F4, F5, F6 (external face). The sheet 7 may be of the same dimension, or larger, than the system 1000.

The glazed assembly 2000 can be:
on the preferably external face of a shower wall or element 7 is a shower wall
or on the preferably internal face (face 'F4') of a curved vehicle glazing, especially a motor vehicle: roof, side glazed unit, windscreen, rear window, or element 7 is the curved glazed unit In particular, the glazed assembly 2000 may serve as projection screen.

FIG. 23 shows a schematic sectional view of a laminated glazed unit 3000 bearing an optical system 1000 according to the invention including the first device 10 linked with the second device 100 by an optical glue 60.

The laminated glazed unit 3000 includes:
a first additional glass sheet 8 that is transparent
a thermoplastic, especially EVA or PVB, lamination interlayer 70
a second transparent additional glass 8' or plastic sheet the main internal faces called F2 and F3 of the first and second additional sheets facing one another, the optical system 1000 being between faces F2 and F3 and within the submillimetric lamination interlayer or of at most 2 mm During manufacture, it is possible to use three interlayer sheets: two full sheets 72, 73 against the internal faces of the sheets 8, 8' and a central sheet 71 with an opening for housing the system 1000. After lamination, the interface between sheets (symbolized by dots) is not necessarily discernible. It is preferred for the opening to be closed rather than entirely opening out on one side. Thus, the whole edge of the system 1000 is surrounded by lamination interlayer 70. Of course, for the power supply, connections can emerge from the system 1000 and even protrude beyond one or more side edges of the glazed units.

Alternatively, it is possible to use only two interlayer sheets, the central sheet with a hole not being necessary if the system 1000 is sufficiently thin, for example of a thickness of at most 0.2 mm.

One of sheets 8 or 8' may be colorless or tinted (gray, green, bronze, etc.) and the other of the glazed units may be clear or extra-clear 8' or 8. One of the first interlayer sheets may be tinted (gray, green, bronze, etc.) and the other(s) clear or extra-clear. One of sheets 8 or 8' may be replaced by a plastic sheet such as a polycarbonate or a PMMA (especially with a PU lamination interlayer).

The edge of the lamination interlayer 70 may be set back (by at most 5 mm, for example) from the edge of sheets 8, 8'.

The system 1000 covers, for instance, virtually the whole of the main faces of the sheets 8 and herein is even centered. There is the same width of PVB on either side of the system 1000.

The sheets 8, 8' are planar or curved, the system 1000 being able to adapt to the curve(s) of the glass sheets then curved 8, 8'.

The optical system 1000 may be a partition or else a vehicle roof. For example, for a vehicle roof:
sheet 8 is the outermost and curved, which is optionally tinted, for example 3 mm
sheet 8' is the innermost, curved, preferably clear or extra-clear, for example 3 mm or thinner
the lamination interlayer 70 is made of PVB which can be acoustic, especially bilayer or trilayer (sheet 71 or 72 or 73).

The roof may therefore also be of color which can be varied, for example from dark blue to light blue, with voltage U1 or U2.

FIGS. 24 and 25 show, respectively, a front view and a schematic sectional view of a laminated glazed unit bearing an optical system 1000 according to the invention.

The laminated glazed unit 4000 differs from the previous one 3000 in that the optical system 1000 covers a surface portion of the sheet 8, in particular a peripheral strip, for example along an upper longitudinal edge H over almost the entire length of the laminated glazed unit.

This is for example a motor vehicle windshield.

This strip-based optical system 1000 is in a marginal zone, wherein the criteria of LT and absence of haze are freer than in the central zone ZB.

This strip-based optical system 1000 may therefore also be of color which can vary, for example from dark blue to light blue with the voltage.

As shown in FIG. 25 (cross sectional view), the width 7a of central interlayer 73 between the optical system 1000 and the lower longitudinal edge B is larger than the width 7b of central interlayer 73 between the optical system 1000 and the upper longitudinal edge H.

As a variant, or in addition, it may be present along a lower longitudinal edge B of the windscreen, over the whole length or a portion of the length.

As shown in FIG. 24 (front view of interior side of vehicle), the windscreen comprises a first opaque frame, for example made of enamel (black or other) 91' to 94' on the lateral and longitudinal edges of the free face (F4) 82' of the internal sheet 8' and a second opaque frame, for example made of enamel (black or other) 91 to 94 on the lateral and longitudinal edges of the free face (F1) 82 of the external sheet 8.

The edge face of the optical system 1000 which is on the side of the lower longitudinal edge, and even those on the side of the lateral edges, can be (facing) between layers 92, 92', 93, 93', 94, 94' of the enamel frames. For example, the connections and other current-supplying strips (for U1 and U2) can also be masked by these layers 92, 92', 93, 93', 94, 94'.

In one variant, it is a motor vehicle roof, for example with the outer glass 8 which is tinted and/or the PVB 71 which is tinted and the optical system 1000 which covers substantially the entire main face of glasses 8, 8'.

The invention claimed is:

1. A liquid crystal optical system, comprising:
  a variable-scattering electrically controllable device forming a first device, including a following stack of layers:
    a transparent first electrode with a first connecting surface and an opposite external surface,
    a transparent second electrode with second connecting surface and with an opposite external surface, with a first electric field between the first and second electrodes,
    a first dielectric electroactive layer with a first main face on the side of the first connecting surface and a second main face made of a first material including:
    first liquid crystals,
    polymers forming a polymeric network, the first liquid crystals being stabilized by the polymeric network,
    the first material exhibits, from a temperature T1, a mesophase P, wherein the first material includes a set of domains, which include two-dimensional topological defects,
  wherein the first material includes at least a first dichroic dye,
  wherein the first electroactive layer has an optical response depending on a state of polarization of an incident light on the first device,
  and the liquid crystal optical system includes, facing the first device, an electroswitchable device with variable polarization forming a second device, the second device including:
  third and fourth transparent electrodes with a second electric field between the third and fourth electrodes,
  a second electroactive layer made of a second material with a third main face on the side of the third electrode and an opposite fourth main face including:
    second liquid crystals which are nematic, and
    second dichroic dyes,
  and wherein the third electrode extends between the second electroactive layer and the first device.

2. The liquid crystal optical system according to claim 1, wherein the second device is devoid of static polarizing films.

3. The liquid crystal optical system according to claim 1, wherein the first electric field is alternating and the second electric field is alternating.

4. The liquid crystal optical system according to claim 3, wherein the first and second electrodes are in distinct planes, and the first liquid crystals have positive dielectric anisotropy.

5. The liquid crystal optical system according to claim 1, wherein the second device has first and second functional states and:
  in the first functional state, from an unpolarized incident light on the side opposite to the first device, the second device is able to deliver an output light on the side of the first device with a first component of the electric field along a first axis and a second component of the electric field along a second axis normal to the first axis, with a first polarization ratio defined by:

$$rp1 = \frac{T1}{T1 + T2} \quad \text{[Math 5]}$$

rp1 being at least 70%, T1 being a total transmission at a wavelength between 380 and 800 nm along the first axis and T2 being a total transmission along the second axis at the wavelength between 380 and 800 nm for a first voltage between the third and fourth electrodes
  and in the second state:
  either i) from an unpolarized incident light on the side opposite to the first device, the second device being able to deliver an output light on the side of the first device with a second polarization ratio defined by:

$$rp2 = \frac{T'2}{T'1 + T'2} \quad \text{[Math 6]}$$

rp2 being at least 30%,
  T'1 being a total transmission at a wavelength between 380 and 800 nm along the first axis and T'2 being a total transmission along the second axis at the wavelength between 380 and 800 nm for a second given voltage U2b between the third and fourth electrodes, U2b being distinct from U2a,
  or j) from an unpolarized incident light on the side opposite to the first device, the second device being able to provide an unpolarized output light on the side of the first device,
  one of the first and second states being in the off state, the other of the first and second states being in an on state.

6. The liquid crystal optical system according to claim 1, wherein the third and fourth electrodes are coplanar, forming an alternation of first and second electrically conductive strips at distinct potentials, first and second electrically conductive strips elongated in a direction r0, and the second device includes:

a unidirectional planar anchoring layer in a direction r1 in contact with the third main face of the second electroactive layer and on the third and fourth electrodes, and another unidirectional planar anchoring layer in a direction r2 in contact with the fourth main face of the second electroactive layer.

7. The liquid crystal system according to claim 6, r1 forms an angle of 90°±15° with r2:
r0 forms an angle of at most 15° with r1 and the second liquid crystals have positive dielectric anisotropy,
or r0 forms an angle of 90°±15° with r1 and the second liquid crystals have negative dielectric anisotropy.

8. The liquid crystal system according to claim 7, wherein r1 forms an angle of 90°±5° with r2:
r0 forms an angle of at most 5° with r1,
or r0 forms an angle of 90°±5° with r1.

9. The liquid crystal optical system according to claim 6, wherein the second device has second twisted nematic liquid crystals in the off state, and the direction r2 is distinct from r1.

10. The liquid crystal optical system according to claim 1, wherein the second device in a first functional state which is the off state is able to deliver a polarized light with a polarization P1 and in a second functional state which is the on state is able to deliver a polarized light with a second polarization P2.

11. The liquid crystal optical system according to claim 10, wherein the polarization P1 is normal to r1 and the second polarization P2 is parallel to r1.

12. The liquid crystal optical system according to claim 1, wherein the second device, in a first functional state which is an off state, is able to deliver a light with a polarization P1, the first device includes a directional anchoring layer along a first direction b on the first main face, the second device is arranged such that the polarization P1 forms an angle with b of 0°±20°.

13. The liquid crystal optical system according to claim 1, wherein the second device, in a first functional state which is an off state, is able to deliver a polarized light with a polarization P1, the first device includes a directional anchoring layer along a first direction b on the first main face FA1, the second device is arranged such that the polarization P1 forms an angle with b of 90°±20°.

14. The liquid crystal optical system according to claim 1, wherein the second electroactive layer is between the third and fourth electrodes and the second device includes:

a unidirectional planar anchoring layer in a direction r1 on the third main face of the second electroactive layer and on the third electrode, and another unidirectional planar anchoring layer, on the fourth main face of the second electroactive layer and on the fourth electrode, wherein:
r1 forms an angle of at most 15° with r2, the second liquid crystals have negative dielectric anisotropy, the orientation of the second liquid crystals in a thickness of the second electroactive layer in an off state of the second device is predominantly homeotropic,
or r1 forms an angle of at most 15° with r2, the second liquid crystals have positive dielectric anisotropy,
or r1 forms an angle of 90°±15° with r2, the second liquid crystals have positive dielectric anisotropy.

15. The liquid crystal optical system according to claim 1, wherein the second device, in a first functional state which is preferably an off state, is capable of delivering a light with a polarization P1
in the first functional state, the haze at the output of the first device is at least 10% greater than the haze obtained with an unpolarized incident light at the input of the first device.

16. The liquid crystal optical system according to claim 1, wherein the mesophase P is nematic.

17. The liquid crystal optical system according to claim 16, wherein the domains are focal conic domains.

18. The optical liquid crystal system according to claim 1, wherein the first device and the second device are disjoined or linked by a transparent bonding layer or wherein a transparent common support bears on a first main face the second electrode and on the other side, on an opposite second main face, the third electrode.

19. A laminated glazed unit comprising:
a first additional glass sheet that is transparent,
a thermoplastic lamination interlayer,
a second transparent additional glass or plastic sheet, and
an optical liquid crystal system according to claim 1,
wherein main internal faces of the first and second additional sheets facing one another, the optical liquid crystal system being between the main internal faces.

20. A vehicle or building glazed unit bearing the optical system according to claim 1.

* * * * *